United States Patent
Fujita et al.

(10) Patent No.: US 8,027,226 B2
(45) Date of Patent: Sep. 27, 2011

(54) OPTICAL DISC RECORDING DEVICE, DATA RECORDING METHOD, AND DATA RECORDING PROGRAM

(75) Inventors: Goro Fujita, Kanagawa (JP); Seiji Kobayashi, Kanagawa (JP); Yuichiro Ikemoto, Kanagawa (JP); Koji Ashizaki, Tokyo (JP)

(73) Assignee: Sony Corporation, Tokyo (JP)

( * ) Notice: Subject to any disclaimer, the term of this patent is extended or adjusted under 35 U.S.C. 154(b) by 276 days.

(21) Appl. No.: 12/431,283

(22) Filed: Apr. 28, 2009

(65) Prior Publication Data

US 2009/0285085 A1    Nov. 19, 2009

(30) Foreign Application Priority Data

May 16, 2008   (JP) ................................ 2008-129732
May 28, 2008   (JP) ................................ 2008-139828

(51) Int. Cl.
   *G11B 21/08*   (2006.01)
(52) U.S. Cl. ................. 369/30.23; 369/30.19; 369/30.2; 369/30.21; 369/30.22; 369/30.24
(58) Field of Classification Search ............... 369/275.3, 369/30.19–30.24
See application file for complete search history.

(56) References Cited

U.S. PATENT DOCUMENTS 5,761,169 A * 6/1998 Mine et al. ................... 369/84
7,859,969 B2 * 12/2010 Maciver et al. ............ 369/59.25

* cited by examiner

*Primary Examiner* — Joseph Haley
*Assistant Examiner* — Ifedayo Iluyomade
(74) *Attorney, Agent, or Firm* — Oblon, Spivak, McClelland, Maier & Neustadt, L.L.P.

(57) ABSTRACT

An optical disc recording device includes: an optical disc device to record optical recording data onto an optical disc; a recording data assigning unit to divide a recording region on the optical disc into multiple divisions, part as a data region, assign optical recording data thereto; a redundancy data calculating unit to calculate redundancy data for restoring recorded data; a redundancy data assigning unit to take divided regions other than the data region as a redundancy region, and assign the corresponding redundancy data thereto; a recording/playing device having a recording capacity greater than the data region; and a recording control unit configured to record optical recording data in the data region and also at least a part thereof in the recording/playing device, cause the recording/playing device to play the optical recording data recorded therein at the time of calculating redundancy data, and record calculated redundancy data in the redundancy region.

8 Claims, 18 Drawing Sheets

FIG. 7

SC (A) FIRST RECORDING REGION: 30000 | 30001 | 30002 | 30003 | ... | BBF6F (B) SECOND RECORDING REGION: BBF70 | BBF71 | BBF72 | BBF73 | ... | 147EDF (C) THIRD RECORDING REGION: 147EE0 | 147EE1 | 147EE2 | 147EE3 | ... | 1D3E4F (D) FOURTH RECORDING REGION: 1D3E50 | 1D3E51 | 1D3E52 | 1D3E53 | ... | 25FDBF

OPTICAL DISC RECORDING DEVICE, DATA RECORDING METHOD, AND DATA RECORDING PROGRAM

BACKGROUND OF THE INVENTION

1. Field of the Invention

The present invention relates to an optical disc recording device, a data recording method, and a data recording program, which can be suitably applied to an optical disc device, for example.

2. Description of the Related Art

Optical disc devices capable of recording music data, user data, and various types of data used with computers and the like, to optical discs such as CD (Compact Disc), DVD (Digital Versatile Disc), DB (Blu-ray Disc), and so forth, and playing or reproducing such data from the optical discs, are in widespread use.

Also, a proposal has been made to record data to and play data from multiple dispersed optical discs, in the same way as with a RAID (Redundant Arrays of Inexpensive Disks) which is configured of multiple hard disk drives, in order to improve the recording speed of information at the optical disc device, i.e., data transfer speed, while also increasing redundancy (e.g., see Japanese Unexamined Patent Application Publication No. 2004-342204 (FIG. 10)).

With this optical disc device, each recording layer is handled in the same way as a single hard disk drive, with information signals given data and redundancy (hereafter referred to as "redundant data") being recorded and played.

SUMMARY OF THE INVENTION

Now, with the optical disc device, the data and redundant data is preferably recorded and played in as short a time as possible. However, at the time of recording redundant data with the RAID function, dispersed data has to be accessed and reproduced, following which computation is performed and the redundant data is generated, so in order to process in a short time the optical disc has to be accessed at high speed. That is to say, with this optical disc device, data has to be read out while rotating the optical disc at a rotation speed far faster than a normal playing speed, and also a seek operation has to be performed at a higher speed than with normal optical disc devices. However, there has been a problem that adding such functions to an optical disc would have to greatly change the configuration of the optical disc device.

It has been realized that there is demand for an optical disc recording device, a data recording method, and a data recording program, capable of recording data and redundant data in an optical disc without greatly changing the configuration of the optical disc device.

An optical disc recording device according to an embodiment of the present invention includes: an optical disc device configured to record optical recording data to be recorded onto an optical disc where data is managed in increments of predetermined blocks; a recording data assigning unit configured to divide a recording region on the optical disc into a predetermined number of divisions, take a part thereof as a data region, and assign the optical recording data to each of the divided regions of the data region; a redundancy data calculating unit configured to calculate redundancy data for restoring the recorded data, based on the recorded data of the blocks that correspond between the divided regions in the data region; a redundancy data assigning unit configured to take the divided regions other than the data region as a redundancy region, and assign the redundancy data to the blocks of the redundancy region corresponding to the blocks in the data region; a recording/playing device configured having a recording capacity greater than the data region, to record and play data; and a recording control unit configured to record the optical recording data in the data region and also record at least a part of the optical recording data in the recording/playing device, by controlling the optical disc device and the recording/playing device, cause the recording/playing device to play the optical recording data recorded therein, at the time of calculating the redundancy data by the redundancy data calculating unit, and record the redundancy data calculated based on the played optical recording data, in the redundancy region.

Thus, optical recording data for calculating the redundancy data can be speedily played, enabling time to calculate the redundancy data to be reduced.

A data recording method and data recording program according to an embodiment of the present invention include the steps of: dividing a recording region on an optical disc where data is managed in increments of predetermined blocks, into a predetermined number of divisions, taking a part thereof as a data region, and assigning optical recording data to be recorded onto the optical disc, to each of the divided regions of the data region; first recording of the optical recording data onto the optical disc; second recording of at least a part of the optical recording data to a recording/playing device configured having a recording capacity greater than the data region; calculating redundancy data for restoring the recorded data, based on the recorded data of the blocks that correspond between the divided regions in the data region, supplied based on the optical recording data played from the recording/playing device; taking the divided regions other than the data region as a redundancy region, and assigning the redundancy data to the blocks of the redundancy region corresponding to the blocks in the data region; and third recording of the redundancy data in the optical disc.

Thus, optical recording data for calculating the redundancy data can be speedily played, enabling time to calculate the redundancy data to be reduced.

An optical disc recording device according to an embodiment of the present invention includes: an optical disc device configured to record optical recording data to be recorded onto an optical disc where data is managed in increments of predetermined blocks; a recording data assigning unit configured to divide a recording region into a predetermined number of divisions, take a part thereof as a data region, and assign the recording data to each of the divided regions of the data region; a redundancy data calculating unit configured to calculate redundancy data for restoring the recorded data, based on the recorded data of the blocks that correspond between the divided regions in the data region; a redundancy data assigning unit configured to take the divided regions other than the data region as a redundancy region, and assign the redundancy data to the blocks of the redundancy region corresponding to the blocks in the data region; a recording/playing device configured having a recording capacity greater than the data region, to record and play device recording data to be recorded in the recording/playing device; and a recording control unit configured to cause the redundancy data calculating unit to calculate the redundancy data by playing device recording data recorded in the recording/playing device in idle time when the optical disc device and the recording/playing device are not operating, and also record the redundancy data in the recording/playing device, and at the time of recording the device recording data as the optical recording data, reproducing the device recording data and the redundancy data from said recording/playing device and recording to the optical disc.

Thus, at the time of recording optical recording data and redundancy data to the optical disc, the redundancy data does not have to be calculated from the optical recording data.

A data recording method and a data recording program according to an embodiment of the present invention include the steps of: dividing a recording region on an optical disc where data is managed in increments of predetermined blocks, into a predetermined number of divisions, taking a part thereof as a data region, and assigning optical recording data to be recorded onto the optical disc, to each of the divided regions of the data region; calculating redundancy data for restoring the recorded data, based on the recorded data of the blocks that correspond between the divided regions in the data region, by playing device recording data recorded in a recording/playing device configured having a recording capacity greater than the data region, in idle time when an optical disc device and the recording/playing device are not operating, and also record the redundancy data in the recording/playing device, taking the divided regions other than the data region as a redundancy region, and assigning the redundancy data to the blocks of the redundancy region corresponding to the blocks in the data region; and at the time of recording the device recording data as the optical recording data, reproducing the device recording data and the redundancy data from the recording/playing device and recording to the optical disc.

Thus, at the time of recording optical recording data and redundancy data to the optical disc, the redundancy data does not have to be calculated from the optical recording data.

According to the above configurations, optical recording data for calculating redundancy data can be speedily played, so the time for calculating redundancy data can be reduced, and accordingly an optical disc recording device, a data recording method, and a data recording program, whereby data and redundancy information can be recorded to an optical disc in a short time can be realized.

According to the above configurations, redundancy data does not have to be calculated from optical recording data at the time of recording optical recording data and redundancy data in the optical disc, and accordingly an optical disc recording device, a data recording method, and a data recording program, whereby data and redundancy information can be recorded to an optical disc in a short time, without greatly changing the configuration of the optical disc recording device, can be realized.

BRIEF DESCRIPTION OF THE DRAWINGS

FIG. 7 is a schematic diagram for describing the correlation of sectors and generating of parity data;

DESCRIPTION OF THE PREFERRED EMBODIMENTS

Now, an embodiment of the present invention will be described in detail.

(1) First Embodiment (1-1) Configuration of Hard Disk Recorder

Figure 1:
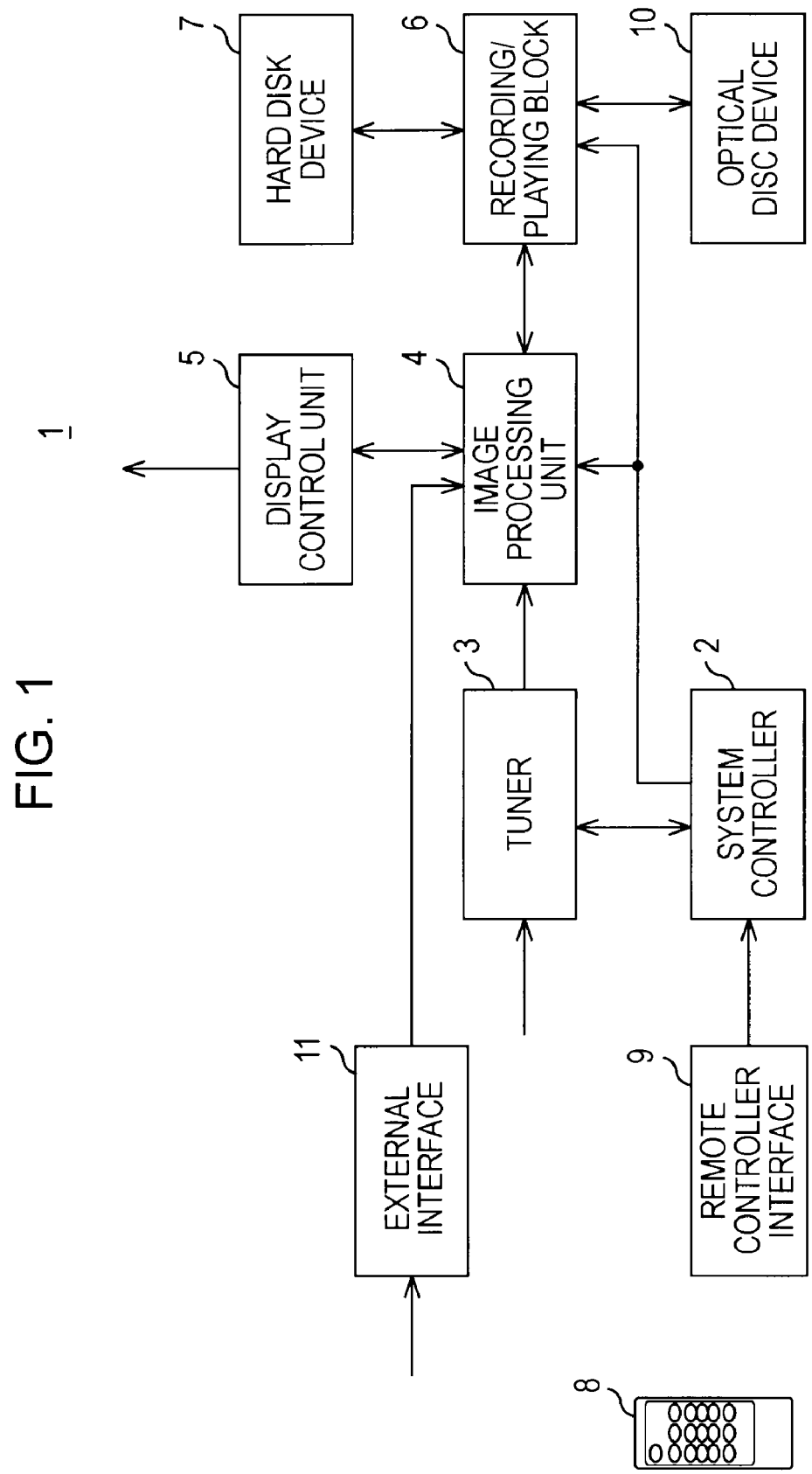
FIG. 1 is a schematic diagram illustrating the entire configuration of a hard disc recorder.

In FIG. 1, reference numeral 1 illustrates a hard disk recorder in general, which is arranged so as to be capable of recording footage data taken at and input from an unshown video camera as video contents, recording and recording television broadcasts of terrestrial digital broadcasting, and so forth.

With the hard disk recorder 1, a system controller 2 configured of an unshown CPU (Central Processing Unit), ROM (Read Only Memory), and RAM (Random Access Memory) centrally controls the hard disk recorder. The system controller 2 loads basic programs, a safe recording program, and so forth, that are stored in the ROM or a hard disk drive 4, to the RAM, and executes various types of processing and later-described parity-added recording processing and so forth, based on the programs.

In the event that a user makes various types of requests by operating an external remote controller 8, the hard disk recorder 1 obtains the operation signals generated at the external remote controller 8 by a remote controller interface 9, and supplies the operation signals to the system controller 2.

For example, upon an operating signal being supplied from the remote controller interface 9 representing a recording request for recording a television program currently being broadcast, the system controller 2 receives the television program currently being broadcast and executes recording processing of television program.

Specifically, the system controller 2 supplies, to a recording/playing block 6, an HD recording command to the effect that the television program is to be recorded in hard disk media (hereafter referred to as "HD media") in a hard disk device 7, selects and receives digital broadcast signals of the selected frequency band with a tuner 3, and supplies the digital broadcast signals to an image processing unit 4 and recording/playing block 6 as user data UD.

The image processing unit 4 generates image data and audio data (hereafter collectively referred to as "image/audio data") by subjecting the user data UD to decoding processing, demultiplexing processing, and so forth, and supplies the image/audio data to a display control unit 5.

The display control unit 5 generates image output signals and audio output signals based on the image/audio data, and supplies the image output signals and audio output signals to an unshown display device, thereby displaying images based on the image data on the display device, and also outputting audio based on the audio data.

Upon the HD recording command and user data UD being supplied, the recording/playing block 6 generates an HD recording address at which to record the user data UD, and supplies the HD recording address to the hard disk device 7 along with the HD recording command and user data UD, thereby recording the user data UD in the hard disk device 7.

Also, upon an operating signal being supplied from the remote controller interface 9 representing a recording request for recording footage in an unshown video camera connected to an external interface 11 in an optical disc 100, the system controller executes recording processing of this user data UD to the optical disc 100.

That is to say, upon footage data being input from the unshown video camera via the external interface 11, the footage data is supplied to the recording/playing block 6 along with an optical disc information command, as user data UD.

The recording/playing block 6 generates an optical disc recording address at which to record the user data UD, and supplies the optical disc recording address to an optical disc device 10 along with the optical disc recording command and user data UD, thereby recording the user data UD in the optical disc 100.

Also, upon an operating signal being supplied from the remote controller interface 9 representing a playing request for playing video/audio data recorded in the HD media or optical disc 100, the system controller 2 executes playing processing of the user data UD.

That is to say, the system controller 2 obtains the user data UD which the user has specified from the hard disk device 7 or the optical disc 10, and supplies the user data UD to the image processing unit 4. The image processing unit 4 generates image/audio data by subjecting the user data UD to decoding processing, demultiplexing processing, and so forth, and supplies the image/audio data to the display control unit 5.

The display control unit 5 generates image output signals and audio output signals based on the image/audio data, and supplies the image output signals and audio output signals to the unshown display device, thereby displaying images based on the image data on the display device, and also outputting audio based on the audio data.

Also, upon an operating signal being supplied from the remote controller interface 9 representing a recording request for recording the user data UD recorded in the HD media to the optical disc 100, the system controller 2 executes recording processing of the user data UD to the optical disc 100.

That is to say, the system controller 2 supplies the user data UD, an optical disc recording command, and playing address information, to the recording/playing block 6. The recording/playing block 6 supplies an information playing command and the playing address information to the hard disk device 7, thereby obtaining the user data UD from the hard disk device 7.

The recording/playing block 6 generates an optical disc recording address at which to record the user data UD, and supplies the optical disc recording address to the optical disc device 10 along with the optical disc recording command and user data UD, thereby recording the user data UD in the optical disc 100.

In this way, the hard disk recorder 1 records the user data UD input from the tuner 3 and the user data UD input from the external interface 11 in the HD media and optical disc 100, and also plays user data UD already recorded in the HD media and optical disc 100.

(1-2) Configuration of Optical Disc Device

Figure 2:
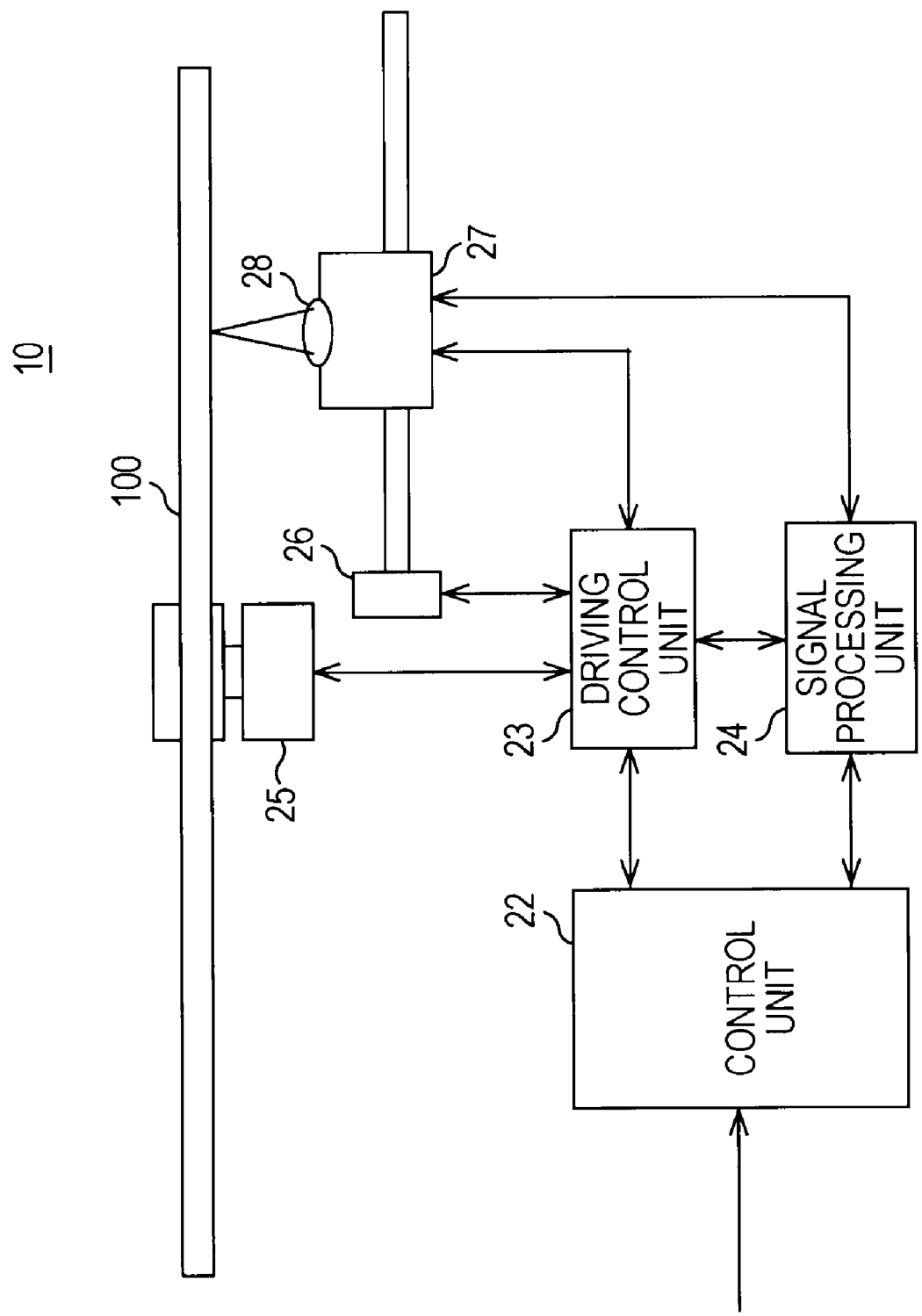
FIG. 2 is a schematic diagram illustrating the configuration of an optical disc device.

As shown in FIG. 2, the optical disc device 10 is configured to record and play information by irradiating an optical beam onto a DVD (Digital Versatile Disc) or BD (Blu-ray Disc (a registered trademark)) optical disc 100, and performing tracking control and focus control.

The optical disc device 10 is centrally controlled by a control unit 22. The control unit 22 is configured mainly around an unshown CPU (Central Processing Unit), and loads various types of programs such as basic programs, information recording programs, a safe recording program, and so forth, from unshown ROM (Read Only Memory), to unshown RAM (Random Access Memory), and executes various types of processing and information recording processing, information playing processing, parity-added recording processing and so forth.

For example, upon receiving an information recording command, user data UD serving as recording information, and optical disc recording address information, from the recording/playing block 6 of the hard disk recorder 1 in a state of an optical disc 100 having been mounted, the control unit 22 supplies the optical disc recording address information and a driving command to a driving control unit 23, and also supplies the user data UD to a signal processing unit 24 as recording information.

It should be noted that a recording layer 100s of the optical disc 100 has spiral or concentric tracks formed, with address assigned thereto as appropriate for identifying the tracks. The optical disc recording address information is information indicating the address of the track to record or play data to or from (hereafter referred to as "target track").

The driving control unit 23 performs driving control of a spindle motor 25 in according with the driving command supplied from the control unit 22, such that the optical disc 100 is rotated at a predetermined rotating speed, and a sled motor 26 is subjecting to driving control so as to move an optical pickup 27 in the track direction of the optical disc 100 (i.e., outer circumference direction or inner circumference direction) along a movement axis, to a position corresponding to the optical disc recording address information.

The signal processing unit 24 generates recording signals by subjecting the supplied recording information to various types of signal processing, such a predetermined encoding processing, modulation processing, and so forth, and supplies these to the optical pickup 27.

The optical pickup 27 emits an optical beam of a predetermined wavelength in accordance with the format of the optical disc 100, from an unshown internal laser diode, and collects the optical beam with an object lens 28, so as to be irradiated into the optical disc 100.

At this time, the optical pickup 27 performs focus control of the object lens 28 and tracking control, based on control by the driving control unit 23, thereby recording data in accordance with the recording signals from the signal processing unit 24 with the irradiation position of the optical beam positioned at the track formed in the recording layer 100s of the optical disc 100.

Also, upon receiving a data playing command and playing address information indicating an address of data to be played, from an external device for example, the control unit 22 supplies a driving command to the driving control unit 23 and also supplies a playing processing command to the signal processing unit 24.

The driving control unit 23 performs driving control of the spindle motor 25 in the same way as with the case of recording data, such that the optical disc 100 is rotated at the predetermined rotating speed, and a sled motor 26 is subjecting to driving control so as to move the optical pickup 27 to the position corresponding to the playing address information.

The optical pickup 27 performs focus control and tracking control based on the control of the driving control unit 23, so as to position the irradiation position of the optical beam at the track indicated by the playing address information on the recording layer 100s of the optical disc 100 (i.e., the target track), and irradiates an optical beam of a predetermined light quantity. At this time, the optical pickup 27 detects a reflected light beam reflected off of the recording layer 100s of the optical disc 100, and supplies detection signals corresponding to the light amount thereof to the signal processing unit 24.

The signal processing unit 24 generates playing data by subjecting the supplied detection signals to various types of signal processing such as predetermined demodulation processing, decoding processing, and so forth, and supplies the playing data to the control unit 22. In response, the control unit 22 outputs the playing data to the external device.

Thus, by controlling the optical pickup 27 with the control unit 22, the optical disc device 10 can record data to a target track of the recording layer 100s of the optical disc 100, and also play data from the target track.

(1-3) Recording Data to Optical Disc

Figure 3:
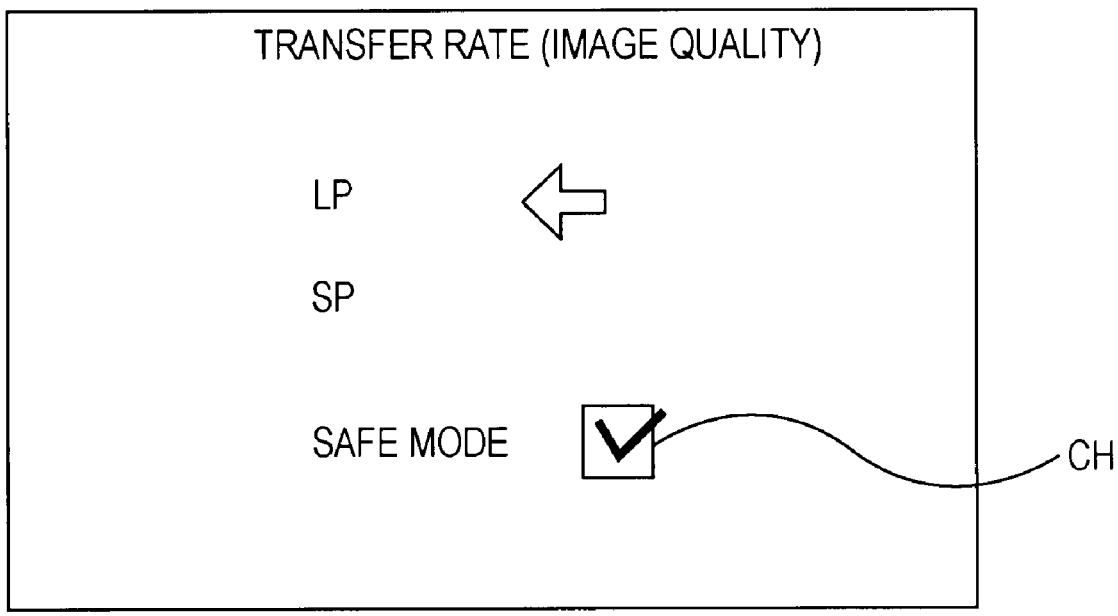
FIG. 3 is a schematic diagram illustrating a safe mode selection screen.

Upon an operating signal being supplied from the remote controller interface 9 representing a recording request for recording user data UD of an unshown video camera connected to the external interface 11 in an optical disc 100, in accordance with operation input from the user at the external remote controller 8, the hard disk recorder 1 displays a safe mode selection screen PC1 on the unshown display device, as shown in FIG. 3.

With the safe mode selection screen PC1, the user selects either a LP (Long Play) mode or SP (Standard Play) mode by moving an arrow displayed on the screen, in accordance with operation input with the remote controller 8. The LP mode is a mode which raises the compression of the user data UD to be recorded (i.e., lowering the image quality thereof), so as to record a greater amount of user data. Also, the SP mode is a mode wherein the user data UD is compressed at normal compression and recorded.

Also, with the safe mode selection screen PC1, a checkbox CH is displayed adjacent to a region where the words "SAFE MODE" are displayed, and the user selects whether or not to check the checkbox CH.

The hard disk recorded 1 has a normal mode and safe mode. The normal mode is a mode wherein the user data UD is sequentially recorded from, for example, the innermost circumferential portion to the outermost circumferential portion of the recording layer 100s of the optical disc 100.

Also, the same mode is a mode wherein the user data UD is recorded in duplicate, or wherein parity data PD of the user data UD is recorded. Thus, in the event that a part of the user data UD recorded in the optical disc 100 is unplayable, playing can still be performed using the duplicate user data UD or parity data PD.

Upon an unshown OK button on the remote controller 8 being operated in a state that the checkbox CH is not checked, the hard disk recorder 1 recognizes that the normal mode has been selected, and records the user data UD sequentially in the optical disc 100.

In the other hand, upon the OK button on the remote controller 8 being operated in a state that the checkbox CH has been checked, the hard disk recorder 1 recognizes that the safe mode has been selected, and displays a RAID (Redundant Arrays of Inexpensive Disks) mode selection screen PC2 on the display device.

In the RAID mode selection screen PC2, the user selects one of three RAID modes "MODE 1", MODE 2", and MODE 3" displayed for the safe mode, by moving the arrow displayed on the screen, in accordance with operation input of the remote controller 8.

With these three modes, the user data UD is recorded in duplicate, or parity data PD of the user data UD is recorded, meaning that the recording capacity of the optical disc 100 is reduced. Accordingly, the RAID mode selection screen PC2 shows a disclaimer to the effect that the recording capacity will be reduced under the three modes.

Mode 1 is a mode wherein the user data UD and the parity data PD generated from the user data UD is recorded (to be described in detail later), and recording the parity data PD reduces the recording capacity of the optical disc 100 to around 75%. Accordingly, the RAID mode selection screen PC2 shows "RECORDING CAPABILITY 75%" next to "MODE 1", thereby enabling the lower to recognize how much reduction there will be in the recording capacity (i.e., the degree of reduction in recording capacity). Note that the degree of reduction in recording capacity is also displayed in the same way for Mode 2 and Mode 3.

Figure 5:
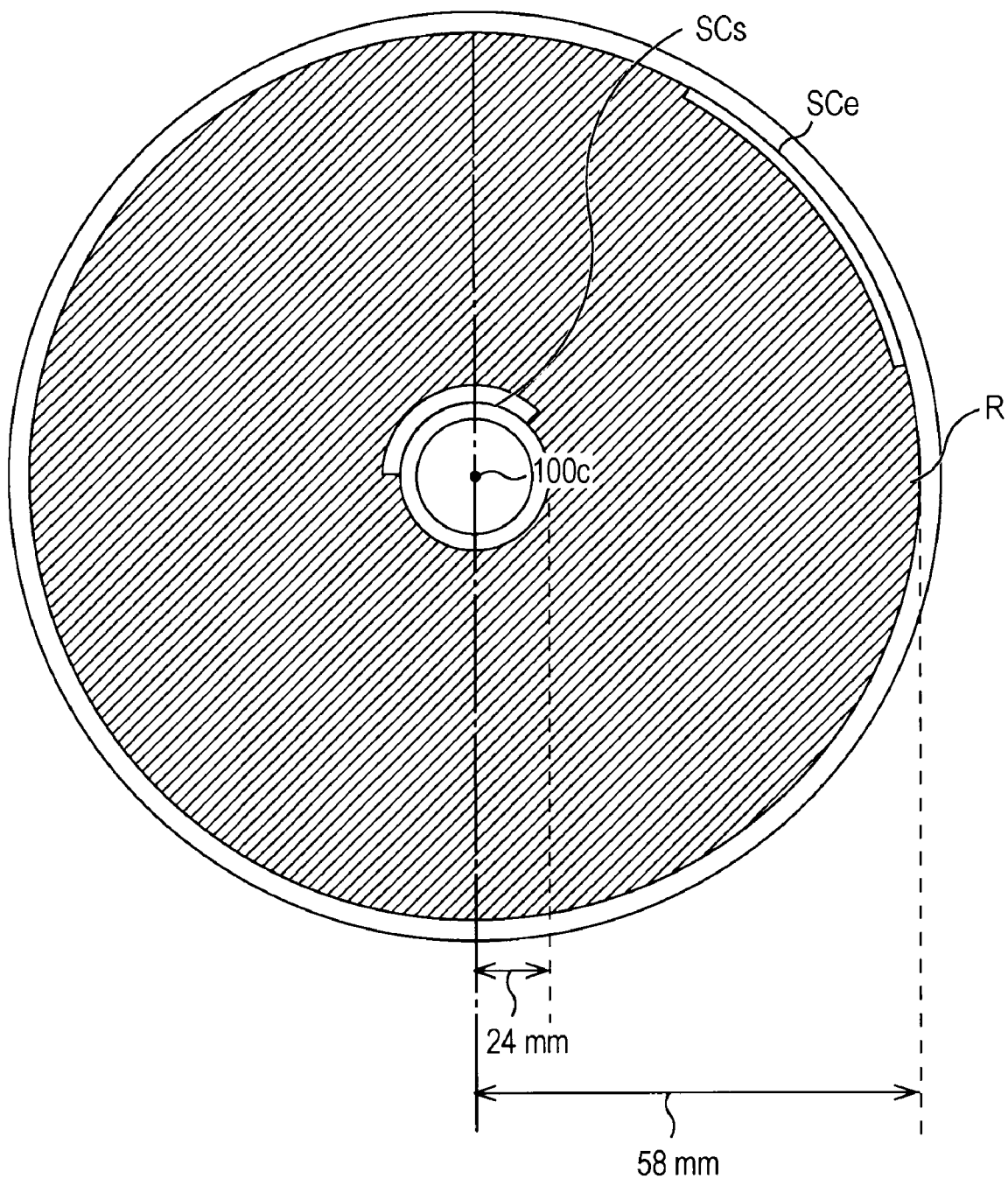
FIG. 5 is a schematic diagram illustrating a recording region of an optical disc.

Specifically, the optical disc 100 is formed as a 120 mm disc as shown in FIG. 5, conforming to the DVD standard. The optical disc 100 has a center hole 100H approximately 15 mm in diameter, so as to be fixed to an output shaft of a spindle motor 25 by way of the center hole 100H by way of a holding unit 5A of the optical disc device 10, as shown in FIG. 2.

Data is recorded in a region of the optical disc 100 which is around 24 to 58 mm from an ideal center 100C, which is shown in FIG. 5 by hatching, and will be referred to as "recording region R" hereafter. Tracks are formed in spiral fashion in the recording region R, and the track interval (i.e., track pitch) is configured to be around 0.7 µm.

Data regarding which recording is intended, i.e., user data UD other than management data, is recorded in the recording region R. At the time of recording the user data UD in the recording region R, error correction encoding calculation and interleaving processing is performed every 32,768 bytes, and further sector division into sectors SC is performed every 2,048 bytes, with each sector SC being managed by a sector No. assigned thereto.

In actual practice, the innermost start sector SCs is assigned address 0x30000 (hexadecimal, as with all addresses in the following description) in the recording region R, and the outermost end sector SCe is assigned the address 0x25FDBF. It should be noted that 2,293,184 sectors SC in decimal exists between the start sector SCs and the end sector SCe, and that the capacity of one sector is 2,048 bytes, so the entire optical disc 100 has capacity of 2,293,184×2,048 bytes=4,696,440,823 bytes, i.e., approximately 4.7 gigabytes.

Figure 6:
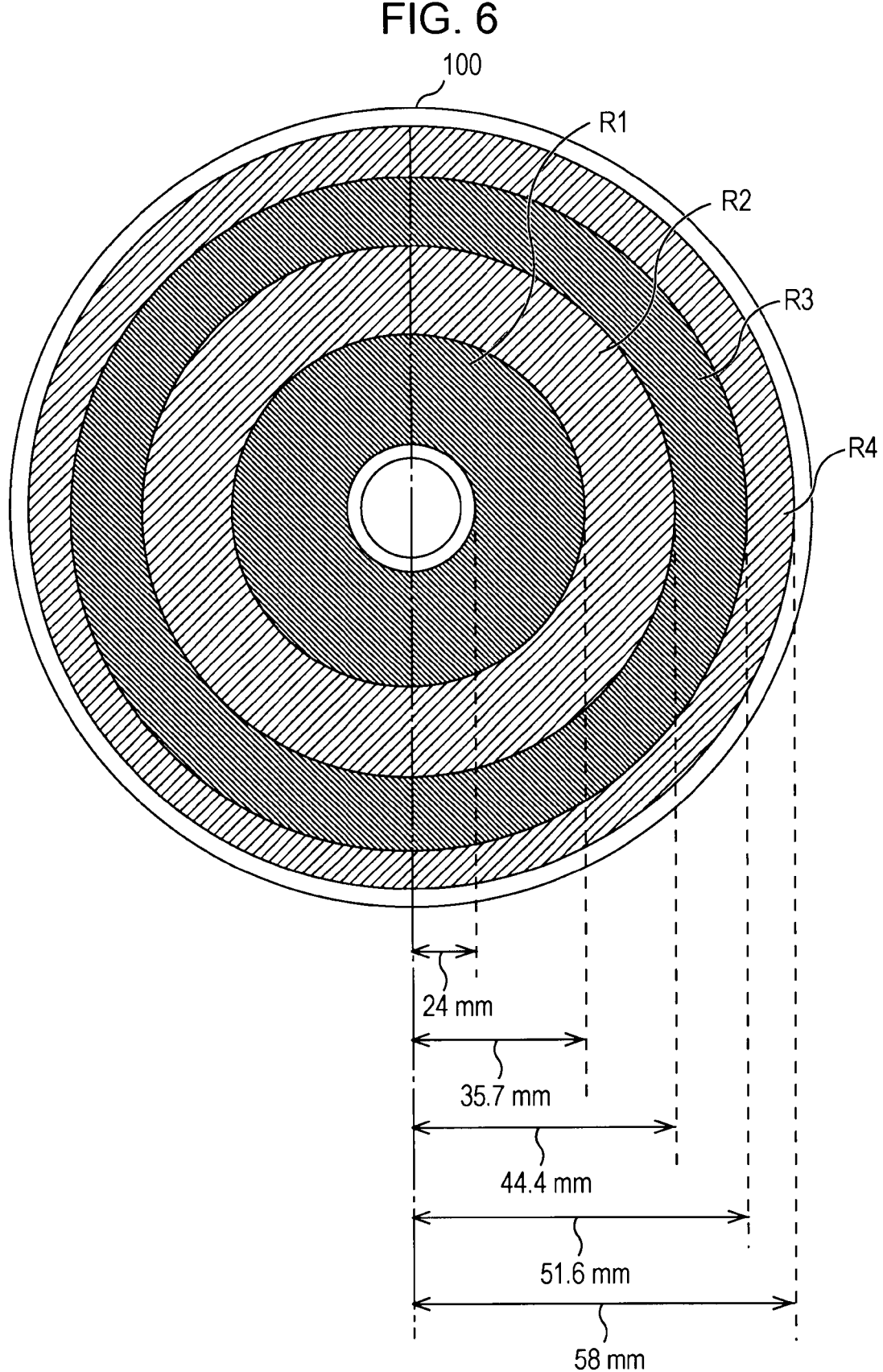
FIG. 6 is a schematic diagram for describing division of the recording region.

As shown in FIG. 6 which corresponds to FIG. 5, with the optical disc 100, the recording region R is divided into the four regions of a first recording region R1, a second recording region R2, a third recording region R3, and a fourth recording region R4. The first recording region R1 through the fourth recording region R4 are divided such that the recording capacity of each is the same, with the boundary portion between the first recording region R1 and the second recording region R2 being approximately 35.7 mm from the center of the optical disc 100, the boundary portion between the second recording region R2 and the third recording region R3 being approximately 44.4 mm from the center of the optical disc 100, and the boundary portion between the third recording region R3 and the fourth recording region R4 being approximately 51.6 mm from the center of the optical disc 100.

Also, the first recording region R1, second recording region R2, and third recording region R3 record user data UD, while the fourth recording region R4 records the parity data PD generated based on the user data UD.

The hard disk recorder 1 (FIG. 1) executes a predetermined data recording program by the system controller 2 at the time of recording data in the optical disc 100, and records the data to be recorded in the optical disc 100 selected by the user (i.e., user data UD) in the optical disc 100.

At this time, the hard disk recorder 1 assigns the user data UD to the sectors SC of the user data UD regions in the optical disc 100, calculates the XOR of the user data UD assigned to mutually corresponding sectors in the user data UD region, and assigns this as parity data PD of the corresponding sectors SC in the parity data region.

Specifically, as shown in FIG. 7, the recording/playing block 6 of the hard disk recorder 1 correlates each sector SC in the first recording region R1, each sector SC in the second recording region R2, each sector SC in the third recording region R3, and each sector SC in the fourth recording region R4, in the order of the addressees of each sector SC. The recording/playing block 6 stores a sector correlation table TS, wherein the correlation of the addresses of the sectors in the first recording region R1 through the fourth recording region R4 have been compiled into a table, in unshown ROM.

The recording/playing block 6 generates parity data PD by calculating the XOR (represented by the operator symbol "$") of the user data UD recorded in the corresponding sectors SC of the first recording region R1 through the third recording region R3, one byte at a time, and the parity data PD is recorded in the sectors of the fourth recording region R4.

For example, the recording/playing block 6 calculates the XOR of the user data UD at the sector SC at the address 0x30000 in the first recording region R1, the user data UD at the sector SC at the address 0xBBF70 in the second recording region R2, and the user data UD at the sector SC at the address 0x147E0 in the third recording region R3, in increments of bytes. The recording/playing block 6 then takes this as the parity data of the sector SC at the address 0x1D3E50 in the fourth recording region R4. Details of parity-added recording processing corresponding to Mode 1 will be described later.

Also, Mode 2 is a mode wherein the user data UD is recorded in the optical disc 100 twice. Accordingly, the same user data UD is recorded twice in a duplicate manner in the optical disc 100 by Mode 2. Accordingly, the recording capacity of the optical disc 100 is reduced to around 50%.

With the optical disc 100 in this case, the recording region R is divided into the two regions of the first recording region R1, and the second recording region R2. The first recording region R1 and the second recording region R2 are divided such that the recording capacity of each is the same, with the boundary portion between the first recording region R1 and the second recording region R2 being approximately 44.4 mm from the center 100C of the optical disc 100.

The hard disk recorder 1 is arranged to record the user data in the first recording region R1, and to record a copy of the same user data in the second recording region R2. At this time, the hard disk recorder 1 correlates the sectors SC of the first recording region R1 with the sectors SC of the second recording region R2 in order of addresses of the sectors SC, such that the same data is recorded in each of the corresponding sectors SC.

Also, Mode 3 is a mode wherein the user data UD is recorded in the optical disc 100 four times. Accordingly, the same user data UD is recorded four times in a duplicate manner in the optical disc 100 in Mode 3.

With the optical disc 100 in this case, the recording region R is divided into the four regions of the first recording region R1 through the fourth recording region R4, in the same way with Mode 1. The hard disk recorder 1 is arranged to record the user data UD in the first recording region R1, and to record a copy of the same user data UD in each of the second recording region R2, third recording region R3, and fourth recording region R4. At this time, the hard disk recorder 1 correlates the sectors SC of the first recording region R1 through the fourth recording region R2 in order of addresses of the sectors SC, such that the same data is recorded in each of the corresponding sectors SC.

With the hard disk recorder 1, the data amount of the user data UD (hereafter referred to as "UD data amount") is confirmed, and compared with the recording capacity of the optical disc 100 in each mode, so as to determine whether or not the user data UD can be recorded in a single optical disc 100.

Figure 4:
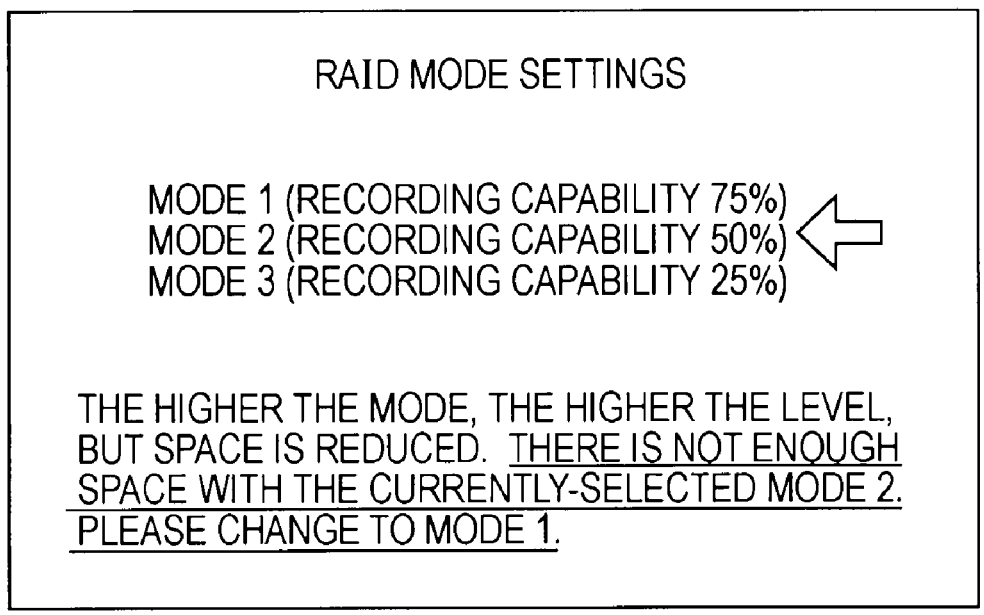
FIG. 4 is a schematic diagram illustrating a RAID mode setting screen.

In the event that the user data UD exceeds the recording capacity of the optical disc 100, the hard disk recorder 1 displays a message at the lower portion of the RAID mode selection screen PC2 (FIG. 4), such as "THERE IS NOT ENOUGH SPACE WITH THE CURRENTLY-SELECTED MODE 2. PLEASE CHANGE TO MODE 1." to inform the user that recording capacity is insufficient and to suggest changing the mode.

Thus, with the hard disk recorder 1, the user can select and switch between the normal mode and safe mode at the time of recording user data UD in the optical disc 100.

(1-4) Parity-Added Recording Processing

Next, the contents of information recording processing in Mode 1 (hereafter referred to as "parity-added recording processing") will be described in detail. The parity-added recording processing according to the first embodiment is a real-time method where parity data PD is generated at the time of recording the user data UD in the optical disc 100.

Upon starting of the parity-added recording processing, the system controller 2 of the hard disk recorder 1 (FIG. 1) supplies the user data UD input from the external interface 11 and an optical disc recording command to the recording/playing block 6. Also, the system controller 2 supplies the recording/playing block 6 with UD data amount information indicating the UD data amount.

Figure 8:
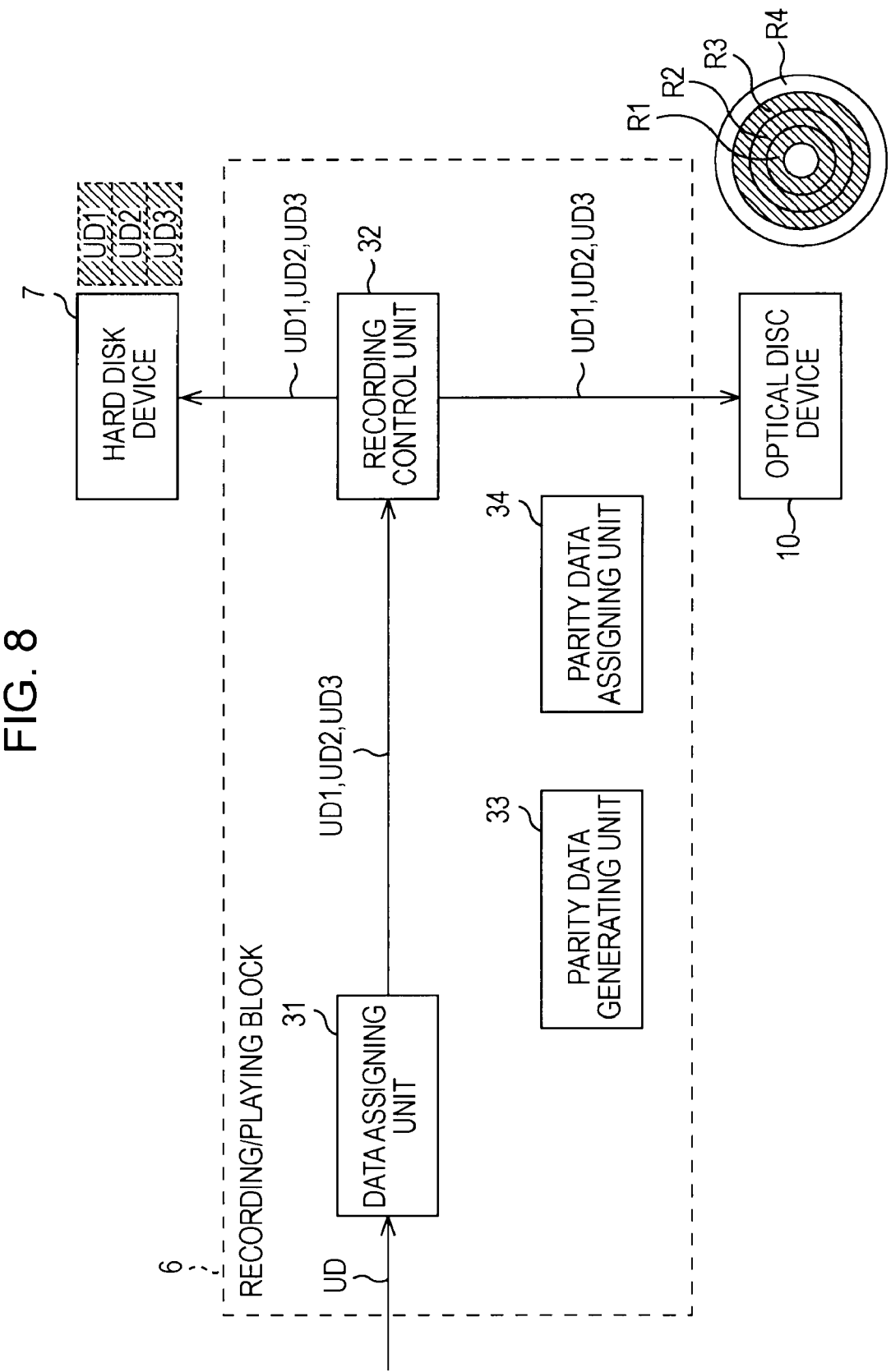
FIG. 8 is a schematic diagram for describing recording to first through third recording regions with a first embodiment.
Figure 9:
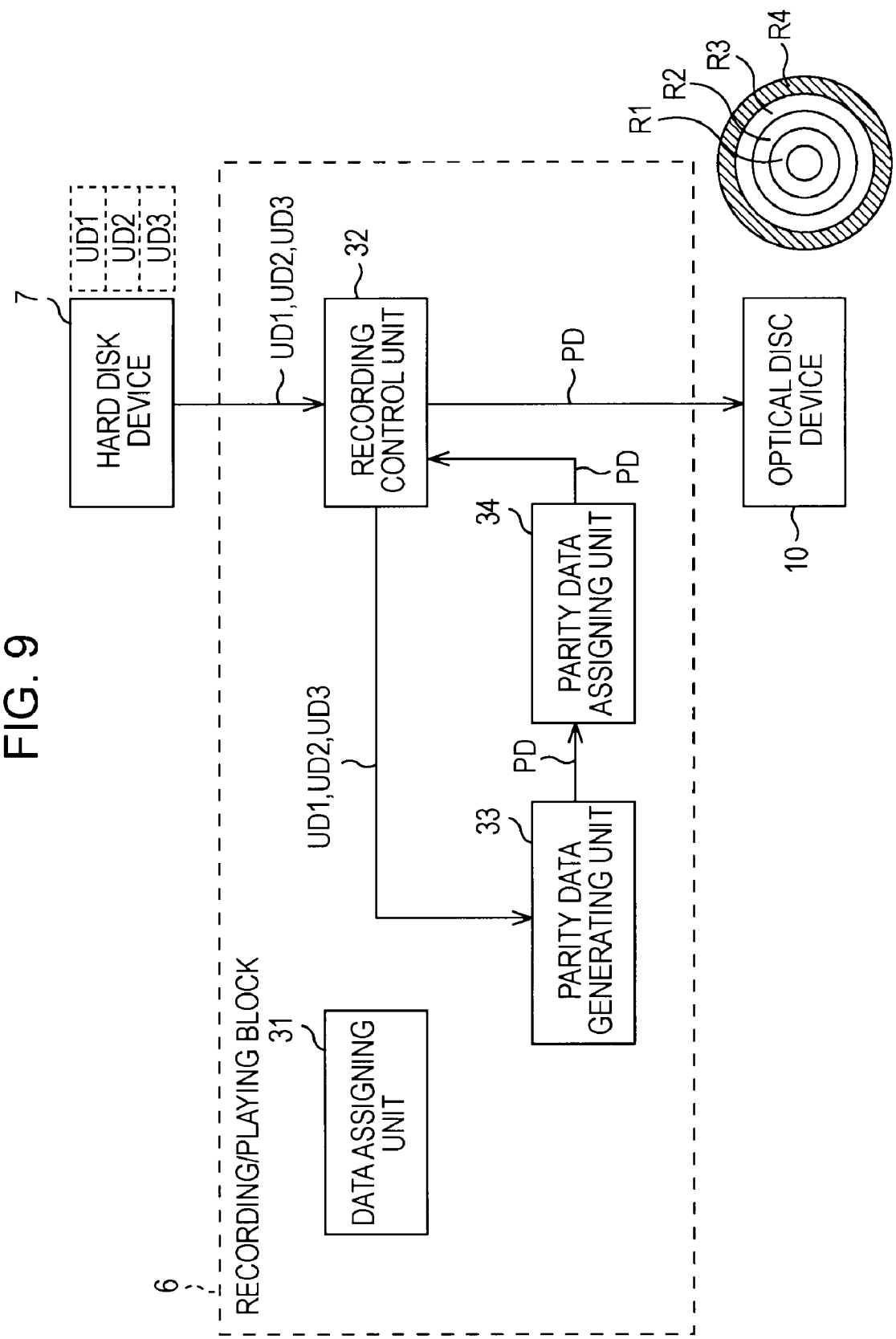
FIG. 9 is a schematic diagram for describing recording to a fourth recording region with the first embodiment.

As shown in FIG. 8, at the recording/playing block 6 the user data UD is supplied to a data assigning unit 31. The data assigning unit 31 divides the user data ID into three equal parts based on the ID data amount information and assigns this to the first recording region R1, second recording region R2, and third recording region R3, and also assigns optical disc recording addresses to the user data, and supplies to a recording control unit 32. Note that hereafter, user data UD assigned to the first recording region R1 will be referred to as first region data UD1, user data UD assigned to the second recording region R2 as second region data UD2, and user data UD assigned to the third recording region R3 as third region data UD3.

The recording control unit 32 supplies the first region data UD1 through the third region data UD3 to the optical disc 10.

As a result, the first recording region R1 through the third recording region R3 of the optical disc 100 have recorded therein the first region data UD1 through the third region data UD3 in the sectors SC indicated as optical disc recording addresses.

The recording control unit 32 adds HD recording addresses to the first region data UD1 through the third region data UD3, and further supplies the first region data UD1 through the third region data UD3 and the HD recording addresses to the hard disk device 7. AS a result, the first region data UD1 through the third region data UD3 are recorded in the HD media in a state with the optical disc addresses added.

Upon encoding recording of the first region data UD1 through third region data UD3 in the optical disc 100, the recording control unit 32 obtains the first region data UD1 through third region data UD3 from the hard disk device 7 several sectors at a time for example, rearrange the first region data UD1 through third region data UD3 in corresponding sectors, and supplies to a parity data generating unit 33.

The parity data generating unit 33 extracts optical disc recording data from the first region data UD1 through third region data UD3, and also generates the parity data PD by calculating the XOR of the first region data UD1 through third region data UD3 following extraction, and supplies this to a parity data assigning unit 34.

The parity data assigning unit 34 adds parity data PD to the optical disc recording addresses in the fourth recording region R4 based on the extracted optical disc recording addresses, and supplies this to the recording control unit 32.

The recording control unit 32 supplies the parity data PD and added optical disc recording addresses to the optical disc device 10. As a result, the parity data PD is recorded in each sector SC indicated by optical disc recording addresses, in the fourth recording region R4 of the optical disc 100.

Thus, the recording/playing block 6 of the hard disk recorder 1 stores the first region data UD1 through third region data UD3 in not only the optical disc 100 but also the HD media. Upon recording the first region data UD1 through third region data UD3 in the optical disc 100, the recording/playing block 6 reads out the first region data UD1 through third region data UD3 from the HD media and generates parity data PD, which is recorded in the optical disc 100.

Thus, the hard disk recorder 1 can speedily obtain the first region data UD1 through third region data UD3 by the hard disk device 7 of which access is fast, so as to generate parity data PD. As a result, the amount of time up to end of recording all first region data UD1 through third region data UD3 and parity data PD in the optical disc 100 can be reduced with the hard disk recorder 1.

(1-5) Playing Data from Optical Disc

In the case of playing an optical disc 100 with parity added by Mode 1, the system controller 2 of the hard disk recorder 1 reads out the user data UD from the start sectors SCs (FIG. 2), i.e., from the address 0x30000 of the first recording region R1 in the same way as with playing a normal optical disc 100.

At this time, the system controller 2 performs predetermined error correction processing regarding all user data UD based on error correction code recorded every 32,768 bytes, and while determining whether or not there are errors, performs correction for any correctable errors. Thereupon, the system controller 2 determines whether or not there has been any data regarding which error correspond processing was not capable of correcting an error (hereafter referred to as "uncorrectable error data").

In the event that there is uncorrectable error data, the system controller 2 recognizes the address of the sector SC where the uncorrectable error data is recorded (hereafter referred to as "error sector SCr"), and reads out the user data ID and parity data from a sector of another division recording region correlated with the error sector SCr, i.e., a corresponding sector (hereafter referred to as "corresponding normal data"). Next, the system controller calculates the XOR of the corresponding normal data, thereby restoring the user data UD in the error sector SCr.

For example, let us say that the system controller 2 was not able to correctly read the user data UD from the sector SC of address 0xBBF71 (FIG. 7) in the second recording region R2, resulting in this sector becoming an error sector SCr. At this time, the system controller 2 reads out the user data UD and parity data from the sector SC of address 0x30001 in the second recording region R1, the sector SC of address 0x147EE1 in the third recording region R3, and the sector SC of address 0x1D3E51 in the fourth recording region R4, and takes these as corresponding normal data.

Next, the system controller 2 performs XOR calculation of the corresponding normal data, thereby restoring the user data UD of the sector SC of address 0xBBF71.

Thus, in the event of playing the user data UD from a parity-added recorded optical disc 100, with regard to an error sector SCr where the user data UD recorded in the user data UD region was not correctly read out, the system controller 2 reads out the user data UD and parity data from sectors SC of other division recording regions corresponding to the error sector SCr and takes these as corresponding normal data, and calculates the XOR of the corresponding normal data to restore the user data UD of the error sector SCr, thereby improving the capability of reading out the user data UD. This manner of playing data will be referred to as "parity restoration playing" hereafter.

Note that the optical disc 100 is not restricted to an optical disc recorded by the optical disc device 10 of the hard disk recorder 1, and may be an optical disc recorded by another optical disc device for example, or a so-called ROM type optical disc where data has been recorded at a factory or the like by pits or the like being formed with a stamper or the like.

(1-6) Mode Selection Processing Procedures

Figure 10:
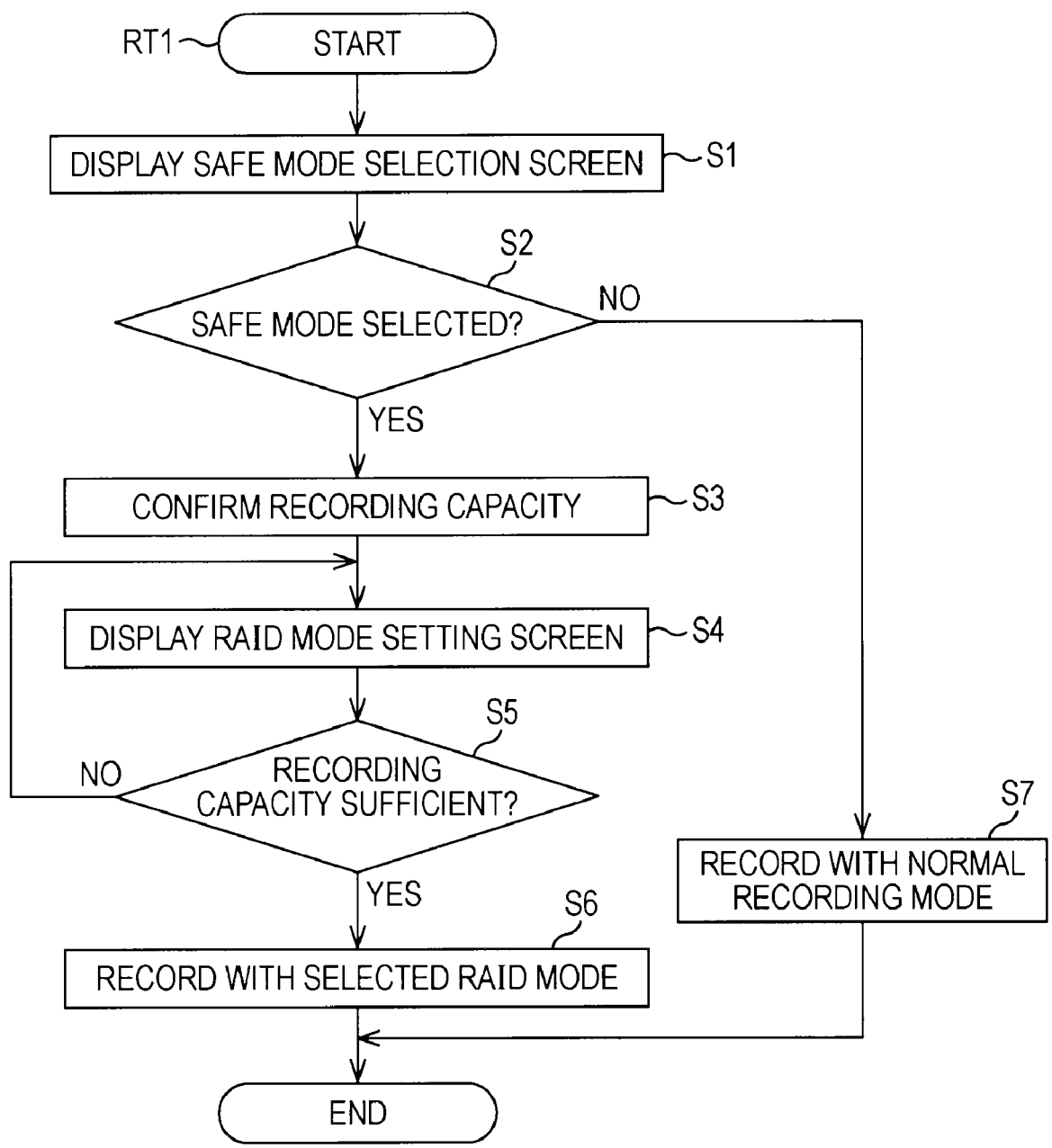
FIG. 10 is a flowchart for describing procedures of mode selection processing.

Next, a mode selection processing procedure RT1 executed in accordance with a safe recording program will be described with reference to the flowchart shown in FIG. 10.

Upon a request being made to record user data UD to an optical disc 100, the system controller 2 of the hard disk recorder 1 advances the flow to step S1.

In step S1, the system controller 2 displays the safe mode selection screen PC1, and upon the user selecting whether to record with the normal mode or safe mode, advances to step S2.

In step S2, the system controller 2 confirms whether or not the safe mode has been selected, and in the event that a negative result is obtained, advances to step S8 and starts recording in the normal recording mode, following which the flow advances to the end step and processing ends.

On the other hand, in the event that a positive result is obtained in step S2, the system controller 2 advances the flow to step S3, confirms the user data UD amount which is the data amount of the user data UD, and the flow advances to the next step S4.

In step S4, the system controller 2 displays the RAID mode selection screen PC2, and upon the user selecting a RAID mode from Mode 1 through Mode 3, the flow advances to the next step S5.

In step S5, the system controller 2 compares the recording capacity of the optical disc 100 according to the selected RAID mode with the UD data amount, and determines whether or not the recording capacity is sufficient.

In the event that a negative result is obtained here, this means that the user data UD will not all be recorded on a single optical disc 100, so in this case the system controller 2 returns to step S4, a display is made on the RAID mode selection screen PC2 to the effect that recording capacity is insufficient and changing of the mode is suggested, and selection of a new RAID mode is awaited.

On the other hand, in the event that a positive result is obtained in step S5, this means that the user data UD can all be recorded on a single optical disc 100, so in this case the system controller 2 advances the flow to step S6.

In step S6, the system controller starts recording of the user data UD with the selected RAID mode from the safe mode, following which the flow advances to the end step and processing ends.

(1-7) Parity-Added Recording Processing Procedure

Figure 11:
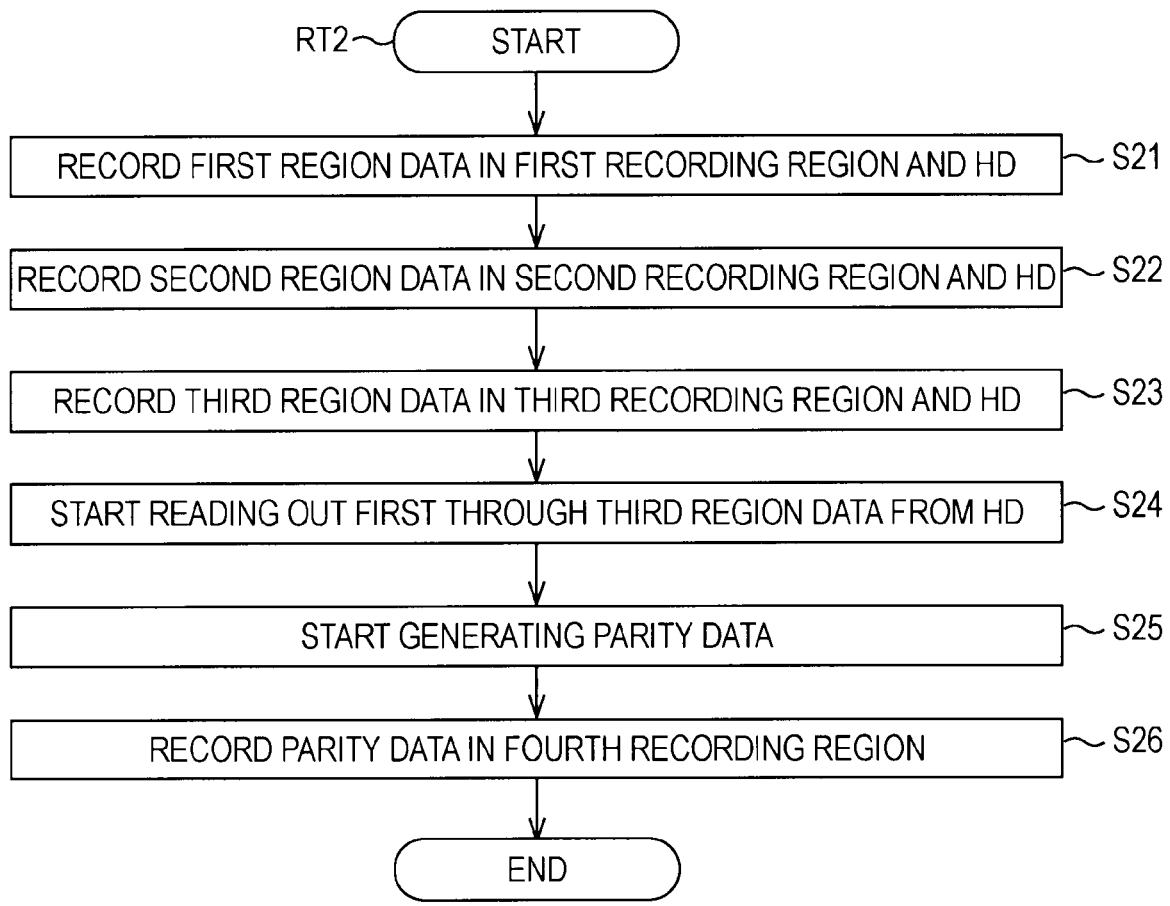
FIG. 11 is a flowchart for describing procedures of parity-added recording processing with the first embodiment.

Next, a parity-added recording processing procedure RT2 executed in accordance with a safe recording program will be described with reference to the flowchart shown in FIG. 11.

Upon starting of the parity-added recording processing, the recording/playing block 6 of the hard disk recorder 1 advances to step S21, records the first region data UD1 in the first recording region R1 of the optical disc 100 and also records the first region data UD1 to the HD media, and then advances to the next step S22.

In step S22, the recording/playing block 6 records the second region data UD2 in the second recording region R2 of the optical disc 100 and also records the second region data UD2 to the HD media, and then advances to the next step S23.

In step S23, the recording/playing block 6 records the third region data UD3 in the third recording region R3 of the optical disc 100 and also records the third region data UD3 to the HD media, and then advances to the next step S24.

In step S24, the recording/playing block 6 starts readout of the first region data UD1 through third region data UD3 from the HD media, and advances to the next step S25.

In step S25, the recording/playing block 6 starts generating of parity data PD based on the first region data UD1 through third region data UD3 being sequentially read out, and advances to the next step S26.

In step S26, the recording/playing block 6 records all of the parity data PD being sequentially generated in the fourth recording region R4 of the optical disc 100, and then advances to the end step and ends processing.

(1-8) Operations and Advantages

With the above configuration, the hard disk recorder 1 has an optical disc device 10 which records user data UD, which is optical recording data to be recorded in an optical disc 100, in the optical disc 100 where data is manages in increments of sectors SC which are predetermined blocks.

The hard disk recorder 1 divides the recording region R of the optical disc 100 into four division regions as the predetermined number of divisions, which are a first recording region R1 through a fourth recording region R4, and of these takes the first recording region R1 through the third recording region R3 as a data region, and assigns user data UD to a first region data UD1 through a third region data UD3.

The hard disk recorder 1 calculates parity data PD, which is redundancy data for restoring user data UD, based on the user data UD for mutually corresponding sectors SC among the first recording region R1 through the third recording region R3 (first region data UD1 through third region data UD3).

The hard disk recorder 1 takes the division region other than the data region as a fourth recording region R4 to serve as a redundancy region, and assigns the parity data PD to the sectors SC of the fourth recording region R4 corresponding to the sectors SC of the first recording region R1 through the third recording region R3.

Also, the hard disk recorder 1 has a hard disk device 7 which has a greater recording capacity than the first recording region R1 through the third recording region R3, serving as a recording/playing device for recording and playing data. The hard disk recorder 1 controls the optical disc device 10 and the hard disk device 7 with the recording/playing block 6, thereby recording the first region data UD1 through third region data UD3 in the first recording region R1 through third recording region R3, and also recording the first region data UD1 through third region data UD3 in the hard disk device 7.

The hard disk recorder 1 plays the user data UD recorded in the hard disk device 7 at the time of calculating the parity data PD upon recording of the first region data UD1 through third region data UD3 in the first recording region R1 through third recording region R3 ending, and records the parity data PD calculated based on the played user data ID in the fourth recording region R4.

Now, the hard disk record 1 records the first region data UD1 through third region data UD3 that is sequentially being supplied, to the first recording region R1 through third recording region R3 of the optical disc 100. On the other hand, the hard disk recorder 1 has to generate parity data PD based on the first region data UD1 through third region data UD3 recorded in each corresponding sector SC in the first recording region R1 through third recording region R3.

That is to say, with the hard disk recorder 1, in the event of playing the first region data UD1 through third region data UD3 from the optical disc 100, there will be the need to access the first recording region R1 through third recording region R3 in an alternating manner. Generally, with the optical disc device 10, access to the optical disc 100 is slow, and each time a separated recording region R is accessed the beam has to be subjected to focusing and tracking again, so accessing the first recording region R1 through third recording region R3 in an alternating manner would take a great amount of time to process the user data UD.

Conversely, with the hard disk device 7, the access speed as to the HD media is vastly faster as compared with the access speed as to the optical disc 100 of the optical disc device 10, and seek operations do not take very much time, either.

The hard disk recorder 1 records the first region data UD1 through third region data UD3 in the HD media of the hard disk device 7 as well, and plays the first region data UD1 through third region data UD3 from the HD media at the time of calculating the parity data PD.

Accordingly, the hard disk recorder 1 can reduce the time for playing the first region data UD1 through third region data UD3, so the amount of time up to recording the parity data PD in the optical disc 100 in parity-added recording processing can be reduced.

In other words, the hard disk recorder 1 is capable of using the hard disk device 7, which originally is used for recording user data UD in accordance with user requests, as work memory as if it were, so the recording capacity of the work memory does not have to be great.

Also, the hard disk recorder 1 records all user data UD (first region data UD1 through third region data UD3) in the HD media of the hard disk device 7, and upon recording of the user data UD to the hard disk device 7 ending and recording of the user data UD to the optical disc 100 encoding, the user data UD is played from the hard disk device 7 and supplied to the parity data generating unit 33.

Thus, the hard disk recorder 1 can generate and record parity data PD based on the user data ID speedily played following recording of the user data UD to the optical disc 100.

Further, the hard disk recorder 1 supplies the user data UD for each mutually corresponding sector SC in the first recording region R1 through third recording region R3 to the parity data generating unit 33.

Accordingly, the hard disk recorder 1 can have a smaller buffer memory capacity as compared with a case of supplying user data UD several sectors SC at a time for example, to the parity data generating unit 33.

According to the above configuration, the hard disk recorder 1 views the first recording region R1, second recording region R2, third recording region R3, and fourth recording region R4, each as independent recording regions, and records user data UD in each sector SC of the first recording region R1 through the third recording region R3. Also, the hard disk recorder 1 calculates the XOR of the user data UD to be recorded in each sector SC mutually corresponding for the first recording region R1 through third recording region R3, takes this as parity data, and records this in corresponding sectors SC of the parity region. This can be viewed as being a technique partially resembling RAID3 or RAID4 using multiple hard disk drives.

At this time, the hard disk recorder 1 records the first region data UD1 through third region data UD3 not only in the first recording region R1 through third recording region R3 of the optical disc 100 but also in the hard disk device 7, and plays the first region data UD1 through third region data UD3 from the hard disk device 7 at the time of calculating the parity data PD. Accordingly, with the hard disk recorder 1, the time for playing the first region data UD1 through third region data UD3 can be reduced markedly as compared with a case of playing the first region data UD1 through third region data UD3 from the optical disc 100, and accordingly, an optical disc recording device and data recording method capable of recording user data UD and parity data PD in the optical disc 100 in a short time without greatly changing the configuration of the hard disk recorder 1 can be realized.

(1-9) Other Embodiments

While an arrangement has been described with the first embodiment described above, in which generating of parity data PD starts upon ending of recording of the third region data UD3 in the third recording region R3 of the optical disc 100, the present invention is not restricted to such an arrangement. For example, an arrangement may be made wherein, upon recording of the third region data UD3 to the hard disk device 7, generating of parity data PD starts.

That is to say, upon supplying all of the third region data UD3 to the hard disk device 7, the recording control unit 32 supplies an information play command and play address information to the hard disk device 7 regardless of the recording status to the optical disc device 10, so as to start playing of the first region data UD1 through third region data UD3. The recording control unit 32 then proceeds to rearrange the first region data UD1 through third region data UD3 according to sectors, and supplies to the parity data generating unit 33, to start generating of parity data PD. Thus, the time lag from ending of recording of the third region data UD3 to the third recording region R3 still starting of recording of parity data PD to the fourth recording region R4 can be reduced.

Also, with the first embodiment described above, a case has been described regarding recording first region data UD1 through third region data UD3 in the HD media of the hard disk device 7, but the present invention is not restricted to this. What is important is to record to memory having recording capacity greater than the first recording region R1 through third recording region R3, so advantages the same as the above-described embodiment can be obtained even with cases of recording to flash memory or the like.

Further, with the first embodiment described above, a case has been described wherein the first region data UD1 through third region data UD3 are sequentially recorded in the first recording region R1 through third recording region R3 of the HD media, but the present invention is not restricted to this. For example, an arrangement may be made wherein mutually corresponding sectors of the first region data UD1 through third region data UD3 are recorded together (e.g., the first region data UD1 through third region data UD3 are recorded every sector). Accordingly, the hard disk recorder 1 can play the first region data UD1 through third region data UD3 corresponding to each sector, without rearranging, but rather simply reading out the first region data UD1 through third region data UD3 from the HD media.

Further, with the above-described first embodiment, a case has been described of applying the present invention to the hard disk recorder 1 having the hard disk device, but the present invention is not restricted to this. What is important is to have an optical disc device, and memory having capacity greater than the recording capacity of the first recording region R1 through third recording region R3, and accordingly application can be made to various types of electronic equipment, such as video camera device, personal computers, and so forth.

Further, with the first embodiment described above, the recording region R of the optical disc 100 has been described as being divided into four divisions, but the present invention is not restricted to this, and an optional number of divisions of three or more may be used. In this case, increasing the number of divisions reduces the capacity of each division recording region, so the parity data capacity is also reduced, meaning that the recording capacity of user data UD can be increased. However, at the time of performing parity restoration playing, data has to be able to be read out correctly from all sectors other than the error sector SCr of the corresponding sectors SC, i.e., from a number of sectors SC equal to the number of divisions minus 1, so this will reduced data playability. Accordingly, in practice, the number of divisions should be decided as appropriate in light of balance between the recording capacity of user data UD and playability. Further, the present invention can be applied to optical discs having multiple recording layers, even in cases of dividing recording regions according to each recording layer.

Further, with the first embodiment described above, a case has been described wherein parity data is calculated by calculating the XOR of each user data UD in corresponding sectors SC, and also restoring the user data UD by calculating the XOR of the user data UD read out correctly and the parity data (i.e., corresponding normal data), but the present invention is not restricted to this, and an arrangement may be made wherein redundant data is calculated by other various computation techniques, and user data UD is restored by computation techniques corresponding thereto.

Further, with the first embodiment described above, a case has been described wherein, at the time of playing data from the optical disc 100, copy data or parity data is read out in a case wherein there is an error which could not be corrected by error correction at the time of readout of the user data UD, but the present invention is not restricted to this, and an arrangement may be made wherein the validity of the user data UD read out is confirmed at all times by reading out the copy data or parity data, regardless of error correction results, for example.

Further, with the first embodiment described above, a case has been described wherein data is made to corresponding between division recording regions in increments of 2,048 bytes, but the present invention is not restricted to this, and an arrangement may be made wherein the size of a sector is an arbitrary number of bytes, and also the data may be made to corresponding between division recording regions in increments of blocks made up of a predetermined number of bytes, other than the sectors SC.

Further, with the first embodiment described above, a case has been described wherein error correction processing is performed every 32,768 bytes, but the present invention is not restricted to this, and an arrangement may be made wherein the increment for error correction processing is an arbitrary number of bytes, or such that in the event of constantly confirming validity of the user data UD as described above, no error correction processing is performed in particular.

Further, with the first embodiment described above, a case has been described wherein the difference values of addressees are constant among the division recording regions, by the sectors SC being combined to serve as corresponding sectors, as shown in FIG. 7, but the present invention is not restricted to this, and an arrangement may be made wherein sectors SC of arbitrary addresses are combined to serve as corresponding sectors; what is important is that the addresses of the sectors SC configuring corresponding sectors can be recognized by referring to the sector correlation table TS.

Further, with the first embodiment described above, a case has been described wherein the addresses of corresponding sectors are recognized by referring to the sector correlation table TS, but the present invention is not restricted to this, and an arrangement may be made wherein, as shown in FIG. 7, the addresses of corresponding sectors SC are calculating using an expression for calculating difference, or the like, in a case in which the difference value of addresses of the respective division recording regions is constant.

Further, with the first embodiment described above, a case has been described wherein the tracks of the optical disc 100 are formed in a spiral, but the present invention is not restricted to this, and an arrangement may be made wherein the tracks are formed concentrically; what is important is that the sectors SC can be uniquely specified.

Further, with the first embodiment described above, a case has been described wherein the optical disc 100 only has one layer for the recording layer on one side, but the present invention is not restricted to this, and an arrangement may be made wherein the optical disc 100 has multiple recording layers for example, or where the optical disc 100 has recording layers on both sides. In this case, an arrangement wherein the sectors SC can be uniquely recognized by addresses is sufficient, and in particular, an arrangement wherein the corresponding sectors SC are not vertically overlapping will improve playability in the event of a defect.

Further, with the first embodiment described above, the type of optical disc 100 has not be restricted in particular, and may be any of a read-only type (ROM type), a recordable type (R type), and a rewritable type (RW type).

Further, instead of the optical disc 100, a single disc-type recording medium may be used wherein information is recorded and played optically, magnetically, or both, or by other techniques, such as magneto-optical disks, magnetic disks, and so forth. In this case, a part should be provided instead of the optical pickup 27 of the optical disc 10, having a function of writing/reading information corresponding to the disc-type recording medium.

Further, with the first embodiment described above, a case has been described wherein various types of programs such as the safe recording program are stored in ROM within the system controller 2, but the present invention is not restricted to this, and an arrangement may be made wherein various types of programs are obtained and executed otherwise, such as for example, the various programs being read out from predetermined DVD-ROM media and installed in unshown non-volatile flash memory and executed, or may be read out from detachable storage media such as an unshown Memory Stick (a registered trademark of Sony Corporation) and directly executed, or further may be obtained via an unshown USB interface, cable LAN (Local Area Network) interface, IEEE (Institute of Electrical and Electronics Engineers) 802.11a/b/g/n, and so forth.

Further, with the first embodiment described above, a case has been described wherein the optical disc device 10 serving as an optical disc device, the data assigning unit 31 serving as a recording data assigning unit, the parity data generating unit 33 serving as a redundancy data calculating unit, the hard disk device 7 serving as a recording/playing device, the parity data assigning unit 34 serving as a redundancy data assigning unit, and the recording control unit 32 serving as a recording control unit, configure the hard disk recorder 1 serving as the optical disc recording device, but the present invention is not restricted to this, and an arrangement may be made wherein an optical disc recording device according to the present invention is configured of various other configurations of optical disc devices, recording data assigning units, redundancy data calculating units, recording/playing devices, redundancy data assigning units, and recording control units.

(2) Second Embodiment

FIGS. 12 through 15 illustrate a second embodiment, and portions corresponding to those in FIGS. 1 through 11 are denoted with the same reference numerals. The second embodiment differs from the first embodiment in that at the time of the third region data UD3 being supplied, the first region data UD1 and second region data UD2 recorded in the HD media is read out and parity data PD is generated. The hard disk recorder 1 and the optical disc device 10 are the same as with the first embodiment, so description thereof will be omitted. Also note that the parity-added recording processing in the second embodiment is performed in real-time, with parity data PD being generated at the time of recording the user data UD in the optical disc 100, as with the case of the first embodiment.

(2-1) Parity-Added Recording to Optical Disc

Figure 12:
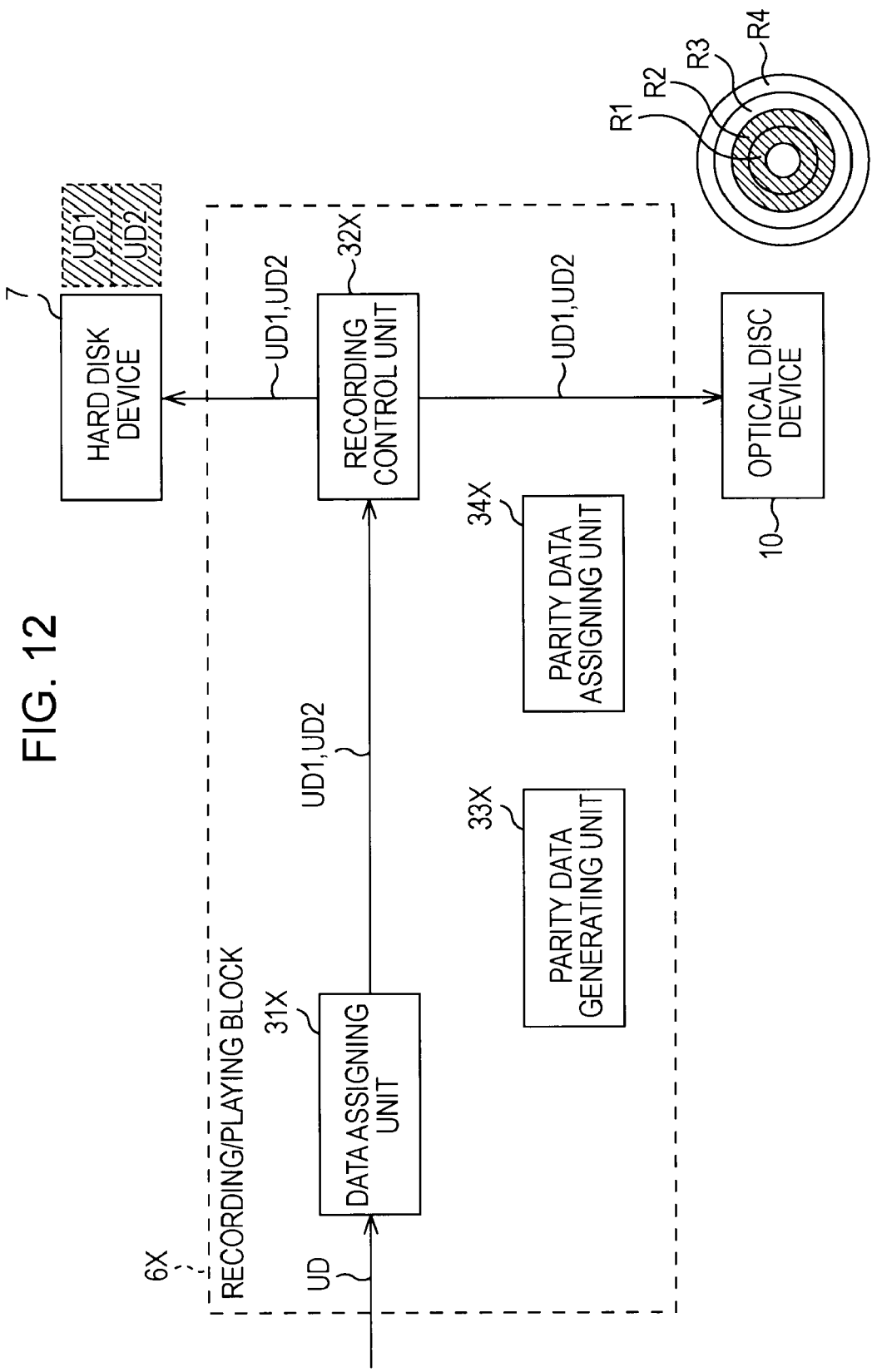
FIG. 12 is a schematic diagram for describing recording to first and second recording regions with a second embodiment.

As shown in FIG. 12 which corresponds to FIG. 12, a data assigning unit 31X divides the user data UD into three equal parts based on the ID data amount information and assigns this to the first recording region R1, second recording region R2, and third recording region R3, and also assigns optical disc recording addresses to the user data UD, and sequentially supplies to a recording control unit 32X.

Upon the first region data UD1 and the second region data UD2 being supplied, the recording control unit 32X supplies the first region data UD1 and the second region data UD2 to the optical disc device 10. The first region data UD1 and the second region data UD2 are recorded in the sectors SC indicated by optical disc recording addresses of the first recording region R1 and second recording region R2 of the optical disc 100.

At the same time, the recording control unit 32X adds HD recording addresses to the first region data UD1 and the second region data UD2, and supplies the first region data UD1 and the second region data UD2, and the HD recording addressees, to the hard disk device 7. As a result, the HD media records the first region data UD1 and the second region data UD2.

The recording control unit 32X is supplied with the third region data UD3 following the first region data UD1 and the second region data UD2. At the recording control unit 32X, upon recording of the first region data UD1 and the second region data UD2 in the HD media of the hard disk device 7, the first region data UD1 and the second region data UD2 corresponding to the third region data UD3 being subsequently supplied are read out from the hard disk device 7, thereby supplying the first region data UD1 through the third region data UD3 for each mutually corresponding sector to a parity data generating unit 33X.

Figure 13:
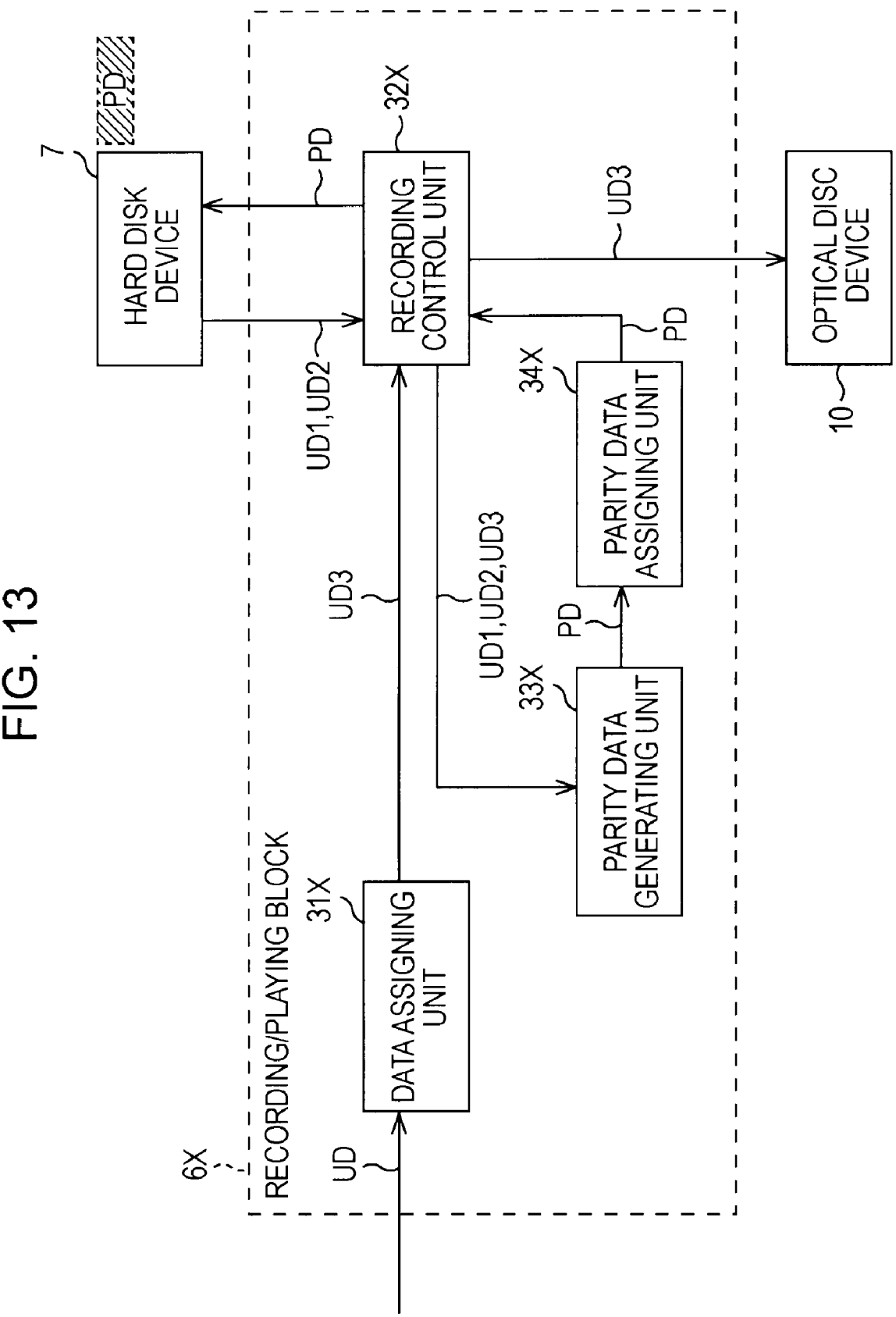
FIG. 13 is a schematic diagram for describing recording to the third recording region with the second embodiment.

At this time, as shown in FIG. 13 corresponding to FIG. 12, the recording control unit 32X records the third region data UD3 to the optical disc 100 in the same way as with the first region data UD1 and the second region data UD2.

The parity data generating unit 33X extracts optical disc recording addresses from the first region data UD1 through the third region data UD3, calculates the XOR of the first region data UD1 through the third region data UD3 and generates parity data PD, and supplies this to a parity data assigning unit 34X along with the extracted optical disc recording addresses.

The parity data assigning unit 34X adds optical disc recording addresses in the fourth recording region R4 to the parity data PD based on the extracted optical disc recording addresses, and supplies these to the recording control unit 32X.

The recording control unit 32X adds HD recording addresses to the parity data PD, and also supplies the parity data PD and HD recording addresses to the hard disk device 7. As a result, parity data PD is recorded in the HD media in a state with optical disc recording addresses attached.

Figure 14:
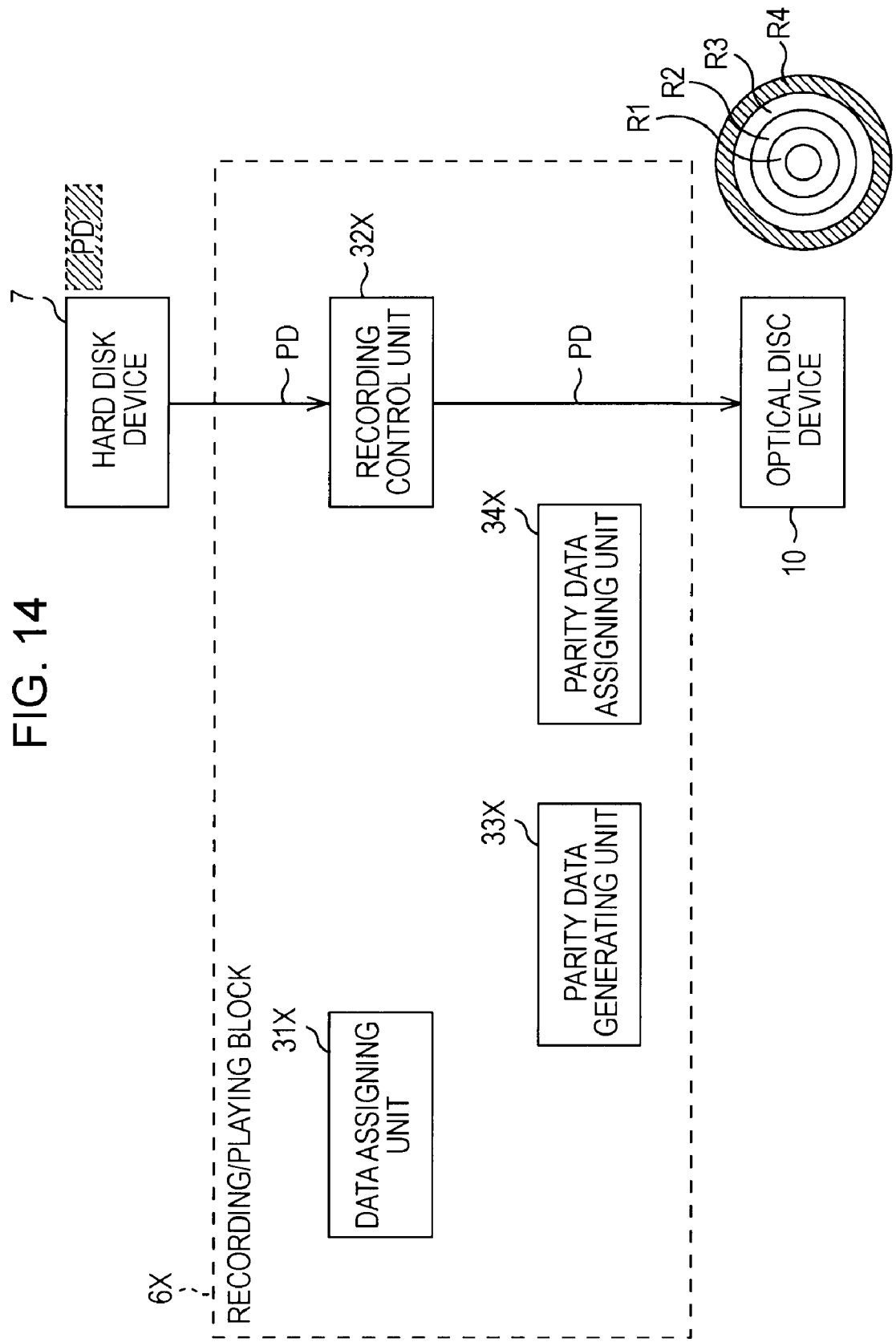
FIG. 14 is a schematic diagram for describing recording to the fourth recording region with the second embodiment.

Upon ending recording of the third region data UD to the optical disc 100, the recording control unit 32X reads out the parity data PD and optical disc recording addresses from the HD media, and supplies the parity data PD and optical disc recording addresses to the optical disc device 10, as shown in FIG. 14 corresponding to FIG. 12. As a result, parity data PD is recorded in the fourth recording region R4 of the optical disc 100, in each sector SC indicated by optical disc recording addresses.

Note that upon recording of the parity data PD to the optical disc 100 ending, the recording control unit 32X erases the first region data UD1 through the third region data UD3 and the parity data PD from the HD media.

Accordingly, the hard disk recorder 1 can prevent the recording capacity of the HD media from being reduced due to data not intended by the user being recorded in the HD media along with the parity-added recording processing.

Thus, with the hard disk recorder 1, the first region data UD1 through and second region data UD2 are recorded not only in the optical disc 100 but also in the HD media. Upon the third region data UD3 being supplied, the hard disk recorder 1 records the third region data UD3 to the optical disc 100, and also reads the first region data UD1 and second region data UD2 corresponding to the third region data UD3 from the HD media and generates parity data PD, and records this in the HD media. Upon ending recording of the third region data UD3 to the optical disc 100, the parity data PD is read out form the HD media and recorded in the optical disc 100.

Accordingly, the hard disk recorder 1 can generate the parity data PD in parallel with recording of the third region data UD3, so all that remains thereafter is to read out the parity data PD from the HD media and record to the fourth recording region R4 of the optical disc 100, and accordingly the amount of time from starting recording of the first region data UD1 until ending recording of the parity data PD can be reduced as compared with the first embodiment.

(2-2) Parity-Added Recording Processing

Figure 15:
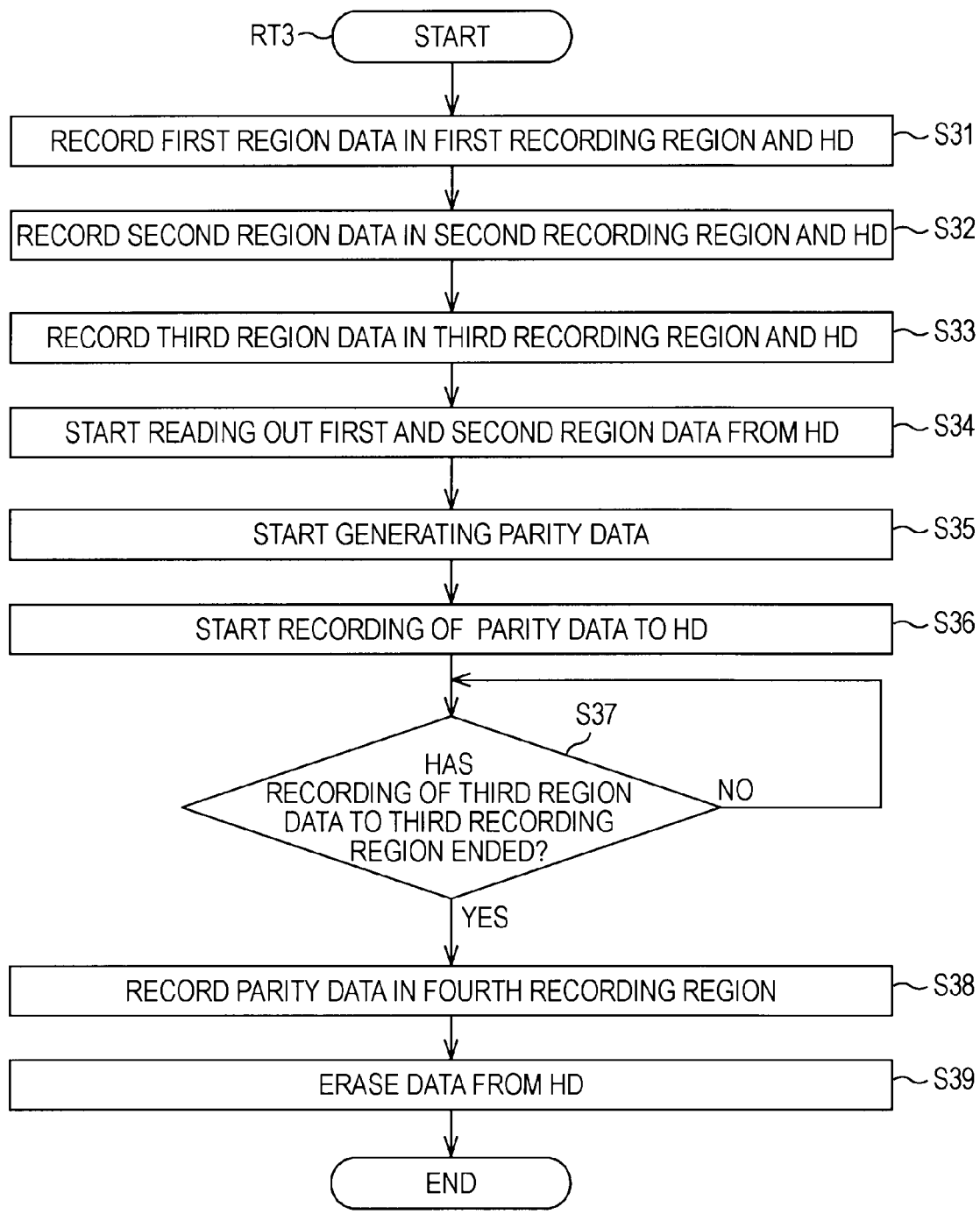
FIG. 15 is a flowchart for describing procedures of parity-added recording processing with the second embodiment.

Next, parity-added recording processing procedure RT3 executed following the safe recording program will be described with reference to the flowchart in FIG. 15.

Upon starting of the parity-added recording processing, a recording/playing block 6X of the hard disk recorder 1 advances to step S31, records the first region data UD1 in the first recording region R1 of the optical disc 100 and also records the first region data UD1 to the HD media, and then advances to the next step S32.

In step S32, the recording/playing block 6X records the second region data UD2 in the second recording region R2 of the optical disc 100 and also records the second region data UD2 to the HD media, and then advances to the next step S33.

In step S33, the recording/playing block 6X starts recording of the third region data UD3 to the third recording region R3 of the optical disc 100, and advances to the next step S34.

In step S34, the recording/playing block 6X starts readout of the first region data UD1 and second region data UD2 from the HD media, and advances to the next step S35.

In step S35, the recording/playing block 6X starts generating of parity data PD from the sequentially-supplied third region data UD3 and the first region data UD1 and second region data UD2 sequentially read out from the HD media, and advances to the next step S36.

In step S36, the recording/playing block 6X starts recording of the parity data PD to the HD media, and advances to the next step S37.

In step S37, the recording/playing block 6X determines whether or not recording of the third region data UD3 to the third recording region R3 has ended, and in the event that a negative result is obtained, continues processing until a positive result is obtained.

On the other hand, in the event that a positive result is obtained in step S37, this means that all of the user data UD has been recorded in the optical disc 100, and at this time the recording/playing block 6X advances the flow to the next step S38.

In step S38, upon reading the parity data PD out form the HD media and recording the parity data PD in the fourth recording region R4, the recording/playing block 6X advances the flow to the next step S39.

In step S39, the recording/playing block 6X erases the first region data UD1 through third region data UD3 and the parity data PD from the HD media, goes to the end step, and ends the parity-added recording processing procedure RT3.

(2-3) Operations and Advantages

With the above configuration, with the hard disk recorder 1, the first region data UD1 and second region data UD2 which are leading region recording data, obtained by the third region data UD3 which is the final region recording data assigned to the third recording region R3 where the last user data UD is recorded to the first recording region R1 through the third recording region R3 being excluded from the user data UD, are recorded to the hard disk device 7.

With the hard disk recorder 1, upon recording of the second region data UD2 to the hard disk device 7 ending, the first region data UD1 and second region data UD2 are played from the hard disk device 7 and supplied to the parity data generating unit 33X, and also the parity data PD generated at the parity data generating unit 33X is recorded to the HD media of the hard disk device 7.

Accordingly, the hard disk recorder 1 can generate parity data PD while the third region data UD3 is being recorded to the third recording region R3, and record the parity data PD in the hard disk device 7, so all that remains thereafter is to read out the parity data PD from the HD media and record to the fourth recording region R4 of the optical disc 100 as it is.

Accordingly, the hard disk recorder 1 can start recording the parity data PD to the fourth recording region R4 as soon as recording of the third region data UD3 to the third recording region R3 ends, for example, with no time lag for generating parity data PD.

(2-4) Other Embodiments

While an arrangement has been described with the second embodiment described above, in which generating of parity data PD is performed by calculating the XOR of the first region data UD1 through the third region data UD3, upon the third region data UD3 being supplied, the present invention is not restricted to such an arrangement. For example, an arrangement may be made wherein the XOR of the first region data UD1 and the second region data UD2 is calculated upon the second region data UD2 being supplied, and stored in the hard disk device 7. Then, upon the third region data UD3 being supplied, the hard disk recorder 1 can generate the parity PD by calculating the XOR of the XOR of the first region data UD1 and the second region data UD2, and the third region data UD3.

(3) Third Embodiment

FIGS. 16 through 19 illustrate a third embodiment, and portions corresponding to those in FIGS. 1 through 11 are denoted with the same reference numerals. The third embodiment differs from the first embodiment in that parity data PD is generated regarding user data UD recording in the HD media beforehand. The hard disk recorder 1 and the optical disc device 10 are the same as with the first embodiment, so description thereof will be omitted.

(3-1) Parity-Added Recording to Optical Disc

The hard disk recorder 1 is configured to assign user data UD to the first recording region R1 through third recording region R3 of the optical disc 100 at the time of recording digital broadcast programs currently being received to the HD media for example, assuming that the user data UD will be recorded to an optical disc 100 in Mode 1. That is to say, the parity-added recording processing according to the third embodiment is a preliminary recording method where the parity data PD is generated and recorded beforehand in a preliminary manner, and the parity data PD is reproduced and recorded at the time of recording the user data UD to the optical disc 100.

Figure 16:
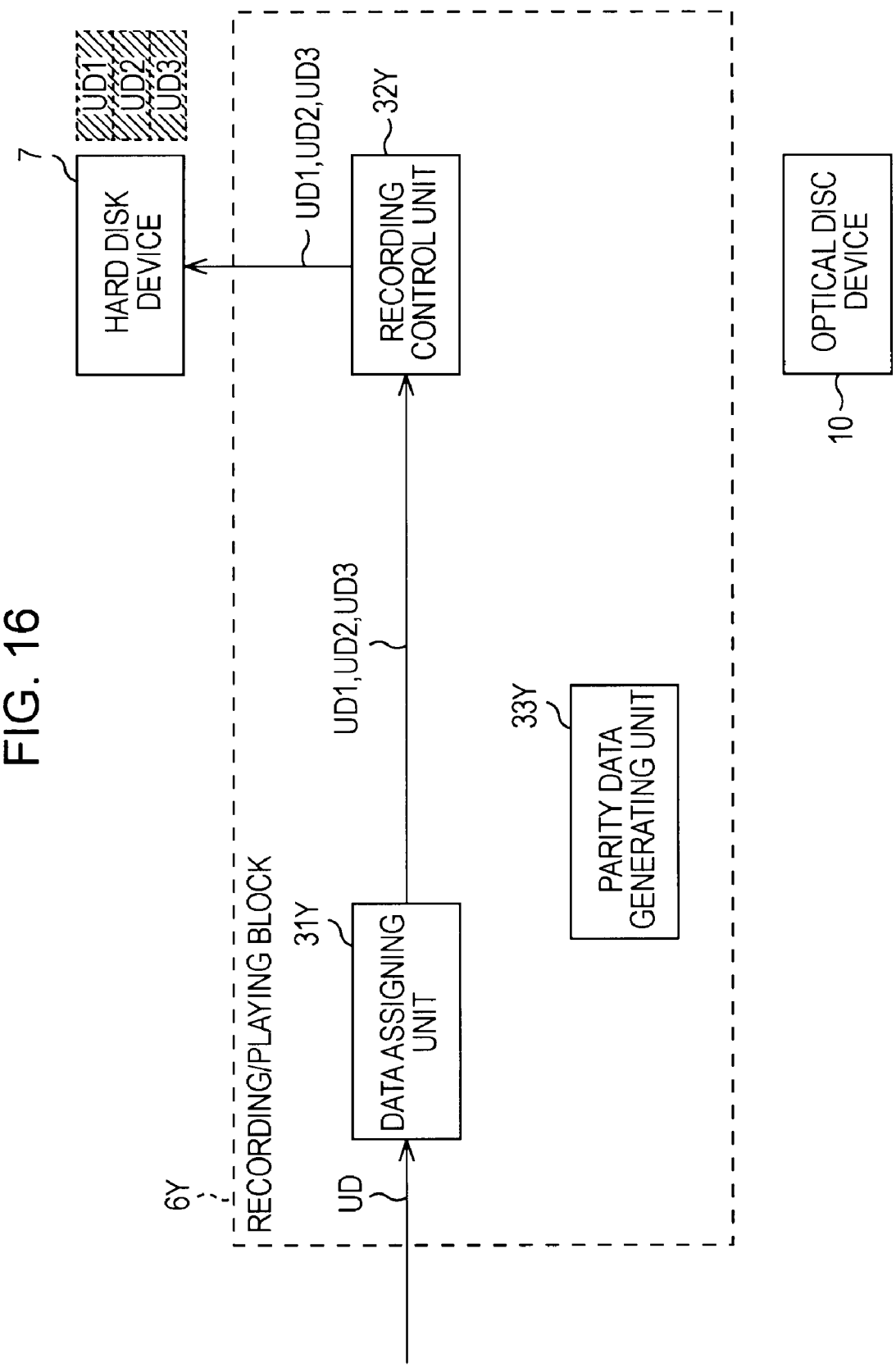
FIG. 16 is a schematic diagram for describing recording of user data to a hard disk drive with a third embodiment.

Specifically, as shown in FIG. 16 which corresponds to FIG. 8, upon receiving an HD recording command to the effect to record user data UD in the HD media, and supply of the user data UD, a recording/playing block 6Y supplies the user data UD to a recording control unit 32Y via a data assigning unit 31Y.

The recording control unit 32Y adds HD recording addressees to the user data UD, and supplies the HD recording addresses and user data UD to the hard disk device 7. As a result, the user data UD is recorded in the HD media.

Upon supply of the user data UD stopping, the data assigning unit 31Y generates division information indicating the data amount from the head of the user data UD whereby the user data UD is divided into approximately three equal parts, based on the UD data amount of the user data UD, and supplies this to the recording control unit 32Y.

The recording control unit 32Y records the user data UD as first region data UD1 through third region data UD3 by recording with the division information and HD recording addresses correlated.

Also, the hard disk recorder 1 is configured to generate parity data PD in idle time when the hard disk recorder 1 is not operating, and to record the parity data PD in the HD media.

Figure 17:
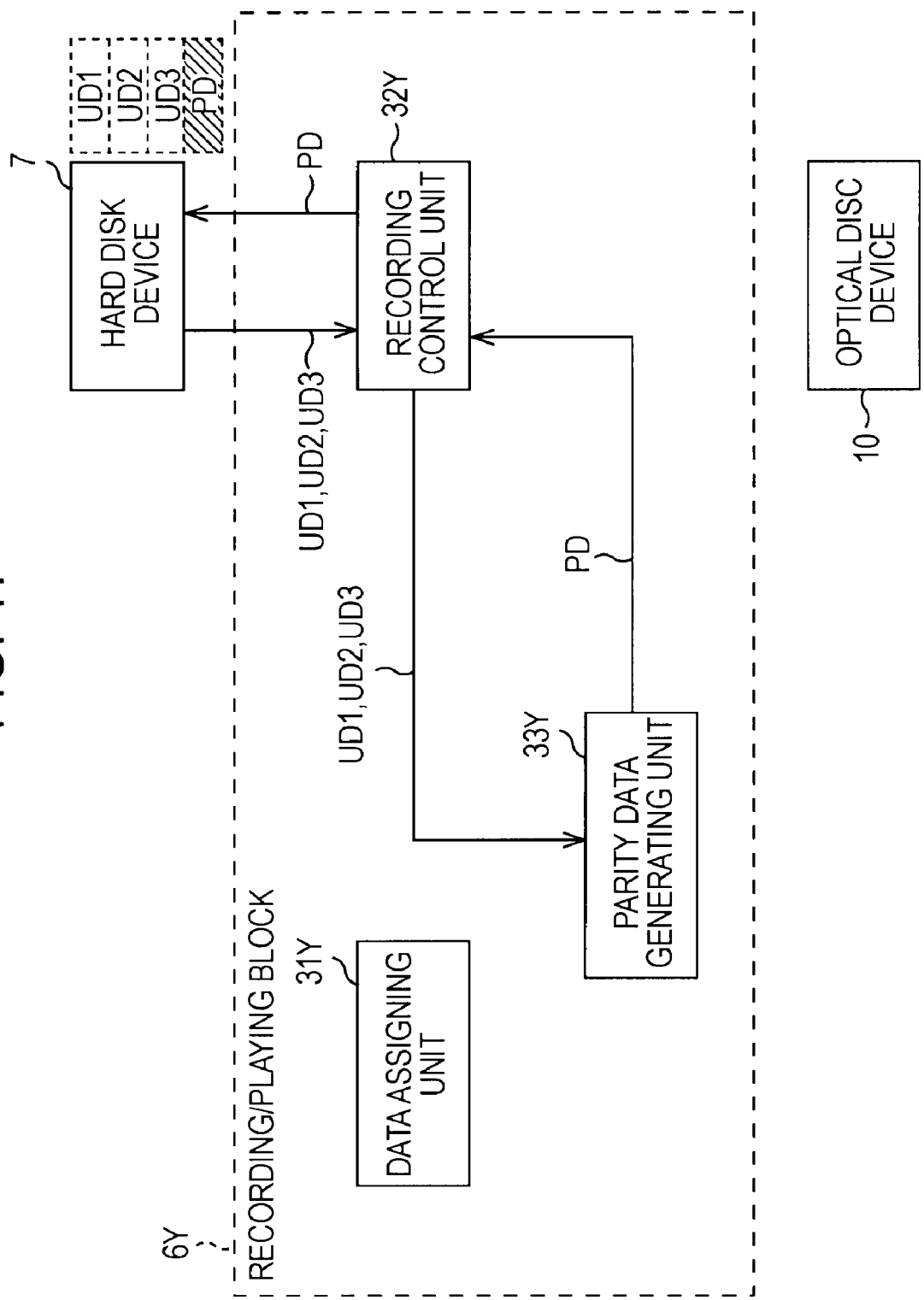
FIG. 17 is a schematic diagram for describing generating of parity data with the third embodiment.

Specifically, as shown in FIG. 17 corresponding to FIG. 16, upon a parity generating command being supplied from the system controller 2, the recording/playing block 6Y reads out the first region data UD1 through third region data UD3 with the recording control unit 32Y, in increments of sectors.

The recording control unit 32Y supplies the first region data UD1 through third region data UD3 to the parity data generating unit 33Y in increments of corresponding sectors. The parity data generating unit 33Y calculates the XOR of the first region data UD1 through third region data UD3 and generates parity data PD, and supplies this to the recording control unit 32Y. The recording control unit 32Y adds HD recording addressees to the parity data PD, and supplies this to the hard disk device 7. As a result, the parity data PD is recorded in the HD media.

Upon a request being made by the user to the effect to record the user data UD recorded in the HD media to an optical disc 100, the hard disk recorder 1 reads out the user data UD and parity data PD from the HD media and records in the optical disc 100.

Figure 18:
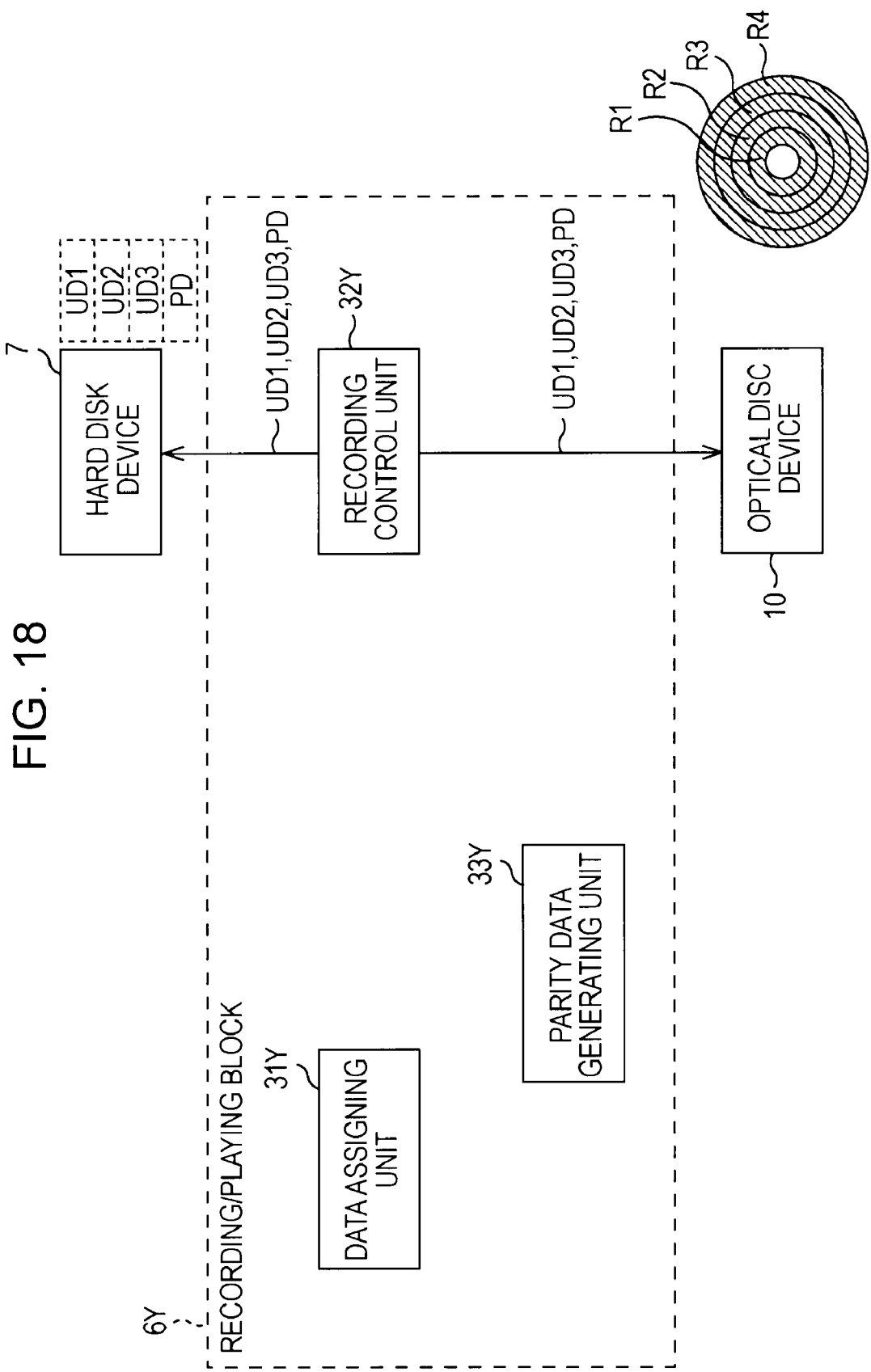
FIG. 18 is a schematic diagram for describing recording to an optical disc with the third embodiment.

Specifically, as shown in FIG. 18 corresponding to FIG. 16, the recording/playing block 6Y sequentially reads out the first region data UD1, second region data UD2, third region data UD3, and parity data PD, with the recording control unit 32Y, and adds optical disc recording addresses and supplies to the optical disc device 10. AS a result, the first region data UD1, second region data UD2, third region data UD3, and parity data PD, are recorded in the first recording region R1 through fourth recording region R4 of the optical disc 100, respectively.

Thus, with the hard disk recorder 1, parity data PD is generated beforehand in idle time when the hard disk device 7 and optical disc device 10 are not operating, and recorded in the hard disk device 7. Accordingly, the hard disk recorder 1 can speedily record the user data UD and parity data PD in the optical disc 100 with simple processing of just reproducing the user data UD and parity data PD from the hard disk device 7 and recording, in response to a recording request in Mode 1 from the user.

(3-2) Parity-Added Recording Processing

Figure 19:
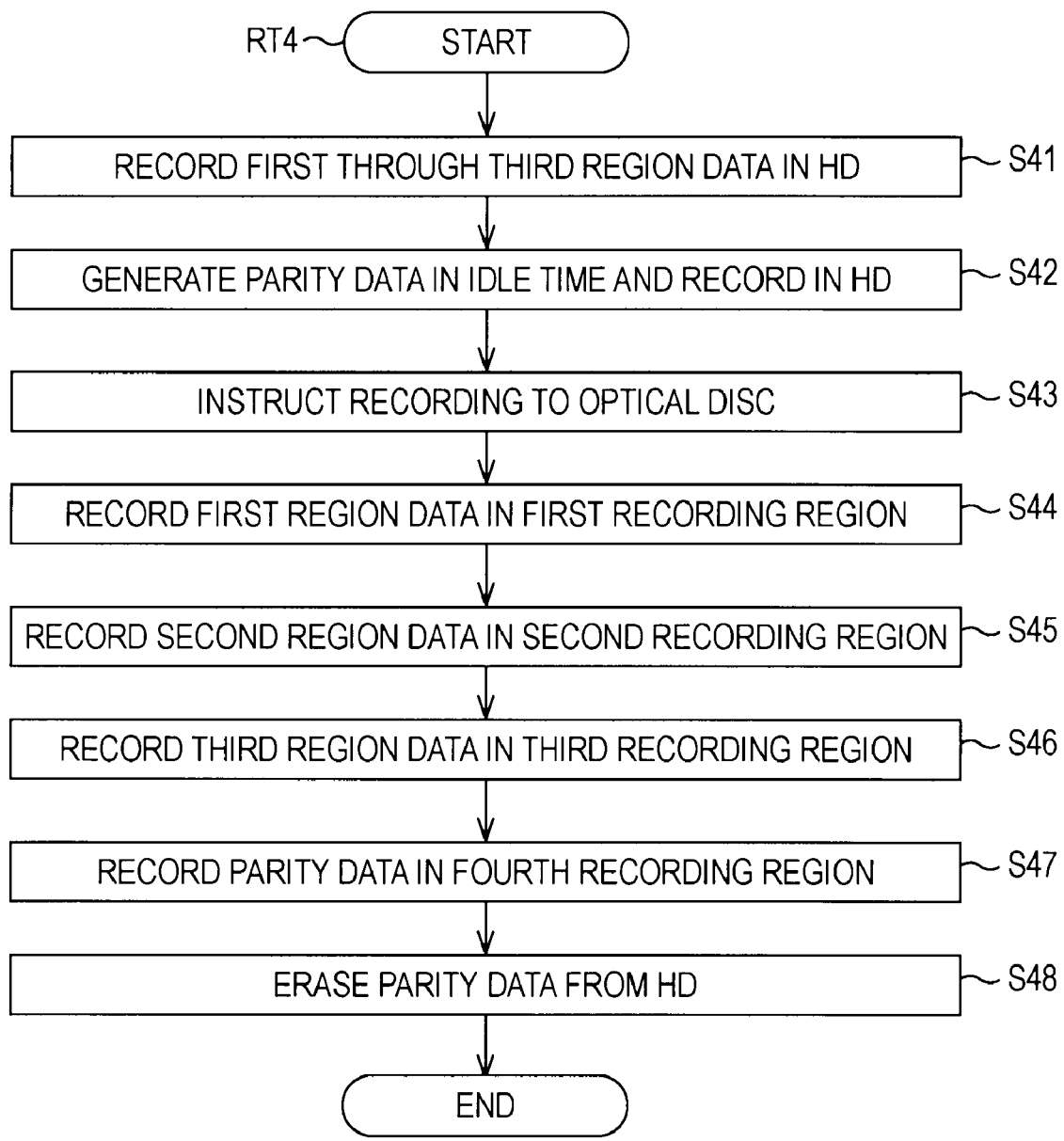
FIG. 19 is a flowchart for describing procedures of parity-added recording processing with the third embodiment.

Next, parity-added recording processing procedure RT4 executed following the safe recording program will be described with reference to the flowchart in FIG. 19.

Upon starting of the recording processing of the user data to the HD media in response to a user request, the recording/playing block 6Y of the hard disk recorder 1 advances to step S41, records the user data UD as first region data UD1, second region data UD2, and third region data UD3, and advances to the next step S42.

In step S42, the recording/playing block 6Y generates parity data PD in idle time when the hard disk recorder 1 is executing neither recording processing nor playing processing, records the parity data PD in the HD media, and advances to the next step S43.

In step S43, the recording/playing block 6Y awaits an optical disc recording command to the effect to record the user data UD recorded in the HD media to the optical disc 100 to be received, and upon the optical disc recording command being received, advances to the next step S44.

In step S44, the recording/playing block 6Y obtains the first region data UD1 from the hard disk device 7, and upon recording the first region data UD1 to the first recording region R1 of the optical disc 100, advances to the next step S45.

In step S45, the recording/playing block 6Y obtains the second region data UD2 from the hard disk device 7, and upon recording the second region data UD2 to the second recording region R2 of the optical disc 100, advances to the next step S46.

In step S46, the recording/playing block 6Y obtains the third region data UD3 from the hard disk device 7, and upon recording the third region data UD3 to the third recording region R3 of the optical disc 100, advances to the next step S47.

In step S47, the recording/playing block 6Y obtains the parity data PD from the hard disk device 7, and upon recording the parity data PD to the fourth recording region R4 of the optical disc 100, advances to the next step S48.

In step S48, the recording/playing block 6Y erases the parity data PD from the HD media, advances to the end step, and ends the parity-added recording processing procedure RT4.

(3-3) Operations and Advantages

With the above configuration, the hard disk recorder 1 generates parity data PD in idle time when neither the optical disc device 10 nor hard disk device 7 are operating, by playing user data UD serving as device-recorded data recorded in the hard disk device 7, supplying to the parity data generating unit 33Y, and causing the parity data generating unit 33Y to calculate the parity data PD.

The hard disc recorder 1 records the parity data PD in the hard disk device 7, and at the time of recording the user data UD in the optical disc 100, reproduces the user data UD and parity data PD from the hard disk device 7 and records in the optical disc 100.

Accordingly, with the hard disk recorder 1, at the time of parity-added recording processing, the user data UD and parity data PD can be recorded in the optical disc 100 in a short time, with simple processing of just reproducing the user data UD and parity data PD from the hard disk device 7 and recording in the optical disc 100.

Also, the hard disk recorder 1 records the user data UD in the hard disk device 7 in a state with no optical disc recording addresses representing sectors SC being added to the user data UD.

Thus, the hard disk recorder 1 can record the user data UD recorded in the hard disk device 7 without change in response to user requests, so at the time of playing the user data UD from the hard disk device 7 in accordance with user requests, the user data UD can be played with normal playing processing.

At this time, the hard disk recorder 1 can record one sector worth of data of the optical disc 100 in every four sectors of HD media, so user data UD can be read out form the HD media by individual sectors of the optical disc 100.

(3-4) Other Embodiments

While an arrangement has been described with the third embodiment described above, where the parity data PD is erased following parity-added recording processing, the present invention is not restricted to this arrangement, and the parity data PD does not necessarily have to be erased. Also, an arrangement may be made wherein the user can select whether or not to erase. For example, the heard disk recorder may be configured such that, in a case wherein the remaining space of the hard disk recorder is dwindling, the user is presented with an erasing selection screen where the user can select to erase part or all of the preliminarily recorded parity data, recorded for safe disc recording.

Also, with the above-described first through third embodiments, description has been made regarding a case of executing parity-added recording processing according to one of the first through third embodiments upon Mode 1 having been selected, but the present invention is not restricted to this arrangement. For example, in the event that Mode 1 is selected from the RAID mode selection screen PC2, the hard disk recorder 1 may display a selection screen not shown in the drawings such that the user can select a real-time method according to the first or second embodiment or a preliminary recording method according to the third embodiment, or, one of the methods may be selected as an initial setting.

Further, with the third embodiment described above, a case has been described wherein the optical disc device 10 serving as an optical disc device, the data assigning unit 31Y serving as a recording data assigning unit, the parity data generating unit 33Y serving as a redundancy data calculating unit, the hard disk device 7 serving as a recording/playing device, and the recording control unit 32Y serving as a redundancy data assigning unit and recording control unit, configure the hard disk recorder 1 serving as the optical disc recording device, but the present invention is not restricted to this, and an arrangement may be made wherein an optical disc recording device according to the present invention is configured of various other configurations of optical disc devices, recording data assigning units, redundancy data calculating units, recording/playing devices, redundancy data assigning units, and recording control units.

The present application contains subject matter related to that disclosed in Japanese Priority Patent Application JP 2008-129732 filed in the Japan Patent Office on May 16, 2008, and in Japanese Priority Patent Application JP 2008-139828 filed in the Japan Patent Office on May 28, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc recording device comprising:
    an optical disc device configured to record optical recording data to be recorded onto an optical disc where data is managed in increments of predetermined blocks;
    a recording data assigning unit configured to divide a recording region on said optical disc into a predetermined number of divisions, take a part thereof as a data region, and assign said optical recording data to each of said divided regions of said data region;
    a redundancy data calculating unit configured to calculate redundancy data for restoring said recorded data, based on the recorded data of said blocks that correspond between said divided regions in said data region;
    a redundancy data assigning unit configured to take said divided regions other than said data region as a redundancy region, and assign said redundancy data to said blocks of said redundancy region corresponding to said blocks in said data region;

a recording/playing device configured having a recording capacity greater than said data region, to record and play data; and a recording control unit configured to
record said optical recording data in said data region and also record at least a part of said optical recording data in said recording/playing device, by controlling said optical disc device and said recording/playing device,
cause said recording/playing device to play said optical recording data recorded therein, at the time of calculating said redundancy data by said redundancy data calculating unit, and
record said redundancy data calculated based on said played optical recording data, in said redundancy region.

2. The optical disc recording device according to claim 1, wherein said recording control unit records all of said optical recording data in said recording/playing device, and upon recording of said optical recording data in said recording/playing device ending, said recording control unit plays said optical recording data from said recording/playing device and supplies to said redundancy data calculating unit.

3. The optical disc recording device according to claim 1, wherein said recording control unit records leading optical recording data excluding, from all optical recording data, final region recording data assigned to a division region of said divided regions of said data region where said optical recording data is recorded last, in said recording/playing device, and upon recording of said leading optical recording data in said recording/playing device ending, said recording control unit plays said leading optical recording data from said recording/playing device and supplies to said redundancy data calculating unit, and also records redundancy data generated by said redundancy data calculating unit in said recording/playing device.

4. The optical disc recording device according to claim 1, wherein said recording control unit supplies said optical recording data to said redundancy data calculating unit in increments of mutually corresponding blocks in said data region.

5. The optical disc recording device according to claim 1, wherein said recording control unit records said optical data in said recording/playing device, in a state of recording addresses representing said blocks being added to device recording data.

6. A data recording method comprising the steps of: dividing a recording region on an optical disc where data is managed in increments of predetermined blocks, into a predetermined number of divisions, taking a part thereof as a data region, and assigning optical recording data to be recorded onto said optical disc, to each of said divided regions of said data region; first recording of said optical recording data onto said optical disc; second recording of at least a part of said optical recording data to a recording/playing device configured having a recording capacity greater than said data region; calculating redundancy data for restoring said recorded data, based on the recorded data of said blocks that correspond between said divided regions in said data region, supplied based on said optical recording data played from said recording/playing device at the time of calculating said redundancy data; taking said divided regions other than said data region as a redundancy region, and assigning said redundancy data to said blocks of said redundancy region corresponding to said blocks in said data region; and third recording of said redundancy data in said optical disc.

7. A non-transitory computer readable storage medium having stored thereon a data recording program causing a computer to execute the steps of: dividing a recording region on an optical disc where data is managed in increments of predetermined blocks, into a predetermined number of divisions, taking a part thereof as a data region, and assigning optical recording data to be recorded onto said optical disc, to each of said divided regions of said data region; first recording of said optical recording data onto said optical disc; second recording of at least a part of said optical recording data to a recording/playing device configured having a recording capacity greater than said data region; calculating redundancy data for restoring said recorded data, based on the recorded data of said blocks that correspond between said divided regions in said data region, supplied based on said optical recording data played from said recording/playing device at the time of calculating said redundancy data; taking said divided regions other than said data region as a redundancy region, and assigning said redundancy data to said blocks of said redundancy region corresponding to said blocks in said data region; and third recording of said redundancy data in said optical disc.

8. A data recording method comprising the steps of:
dividing a recording region on an optical disc where data is managed in increments of predetermined blocks, into a predetermined number of divisions, taking a part thereof as a data region, and assigning optical recording data to be recorded onto said optical disc, to each of said divided regions of said data region;
calculating redundancy data for restoring said recorded data, based on the recorded data of said blocks that correspond between said divided regions in said data region, by playing device recording data recorded in a recording/playing device configured having a recording capacity greater than said data region, in idle time when an optical disc device and said recording/playing device are not operating, and also record said redundancy data in said recording/playing device,
taking said divided regions other than said data region as a redundancy region, and assigning said redundancy data to said blocks of said redundancy region corresponding to said blocks in said data region; and
at the time of recording said device recording data as said optical recording data, reproducing said device recording data and said redundancy data from said recording/playing device and recording to said optical disc.

* * * * *